US009613632B2

(12) United States Patent
Sugiyama

(10) Patent No.: US 9,613,632 B2
(45) Date of Patent: Apr. 4, 2017

(54) SIGNAL PROCESSING DEVICE, SIGNAL PROCESSING METHOD AND SIGNAL PROCESSING PROGRAM

(75) Inventor: Akihiko Sugiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 13/878,943

(22) PCT Filed: Sep. 26, 2011

(86) PCT No.: PCT/JP2011/072689
§ 371 (c)(1),
(2), (4) Date: Apr. 11, 2013

(87) PCT Pub. No.: WO2012/049986
PCT Pub. Date: Apr. 19, 2012

(65) Prior Publication Data
US 2013/0197905 A1 Aug. 1, 2013

(30) Foreign Application Priority Data
Oct. 12, 2010 (JP) ................................. 2010-230062

(51) Int. Cl.
G10L 21/00 (2013.01)
G10L 21/0208 (2013.01)
(Continued)

(52) U.S. Cl.
CPC ......... G10L 21/0208 (2013.01); H04M 9/082 (2013.01); G10L 2021/02165 (2013.01)

(58) Field of Classification Search
CPC . G10L 2021/02165; G10L 2021/02166; G10L 21/02; H04R 3/02; H04R 1/406;
(Continued)

(56) References Cited

U.S. PATENT DOCUMENTS 3,786,195 A * 1/1974 Schiffman ............... G10L 21/04
704/211
5,444,443 A * 8/1995 Umeda ..................... G01S 5/20
340/933

(Continued)

FOREIGN PATENT DOCUMENTS

CN 1602116 A 3/2005
JP 05-344011 A 12/1993
(Continued)

OTHER PUBLICATIONS

Communication dated Jun. 18, 2014 from The State Intellectual Property Office of the People's Republic of China in counterpart application No. 201180056020.5.

Primary Examiner — Michael Colucci
(74) Attorney, Agent, or Firm — Sughrue Mion, PLLC

(57) ABSTRACT

To achieve sufficient noise cancellation when a reference signal cannot be captured in the proximity of a noise source. The present invention is characterized by comprising: a first input means for obtaining a first mixed signal in which a first signal and a second signal are mixed; a second input means for obtaining a second mixed signal in which the first signal and the second signal are mixed in a different ratio from the first mixed signal; a delay means for generating a delayed first mixed signal by delaying the first mixed signal with a delay amount based on transmission distance from a generation source of the second signal to the second input means; a subtracting means for outputting an estimated first signal in which a pseudo second signal is subtracted from the delayed first mixed signal; and an adaptive filtering means for generating the pseudo second signal applying coefficients which are updated based on the estimated first signal to the second mixed signal.

9 Claims, 17 Drawing Sheets

(51) Int. Cl.
*H04M 9/08* (2006.01)
*G10L 21/0216* (2013.01)

(58) Field of Classification Search
CPC ..... H04R 2201/403; G10K 2210/3027; G10K 2210/3215
USPC ........ 704/500, 211, 226; 381/66, 71.1, 71.7, 381/92, 94.3
See application file for complete search history.

(56) References Cited

U.S. PATENT DOCUMENTS

| | | | | |
|---|---|---|---|---|
| 5,699,437 | A * | 12/1997 | Finn | .................. G10K 11/1788 381/71.12 |
| 8,996,365 | B2 * | 3/2015 | Yamaguchi | .............. H04R 3/02 704/225 |
| 2004/0059571 | A1 * | 3/2004 | Ohtomo | ................ H04M 9/082 704/226 |
| 2005/0234715 | A1 * | 10/2005 | Ozawa | ................ G10L 21/0208 704/226 |
| 2007/0071253 | A1 * | 3/2007 | Sato | .................... G10L 21/0208 381/94.3 |
| 2009/0147967 | A1 * | 6/2009 | Ishibashi | .................. H04R 1/40 381/92 |
| 2009/0285405 | A1 * | 11/2009 | Zhang | .................... H04R 29/00 381/58 |
| 2010/0208907 | A1 * | 8/2010 | Ukai | ........................ H04R 3/02 381/66 |
| 2010/0226492 | A1 * | 9/2010 | Takada | .................. H04M 9/082 379/406.08 |
| 2012/0063610 | A1 * | 3/2012 | Kaulberg | ............. H04R 25/407 381/71.1 |

FOREIGN PATENT DOCUMENTS

| | | |
|---|---|---|
| JP | 06-090492 A | 3/1994 |
| JP | 08-241086 A | 9/1996 |
| JP | 3132529 B2 | 11/2000 |
| JP | 2004-023404 A | 1/2004 |
| JP | 2005-057437 A | 3/2005 |

* cited by examiner

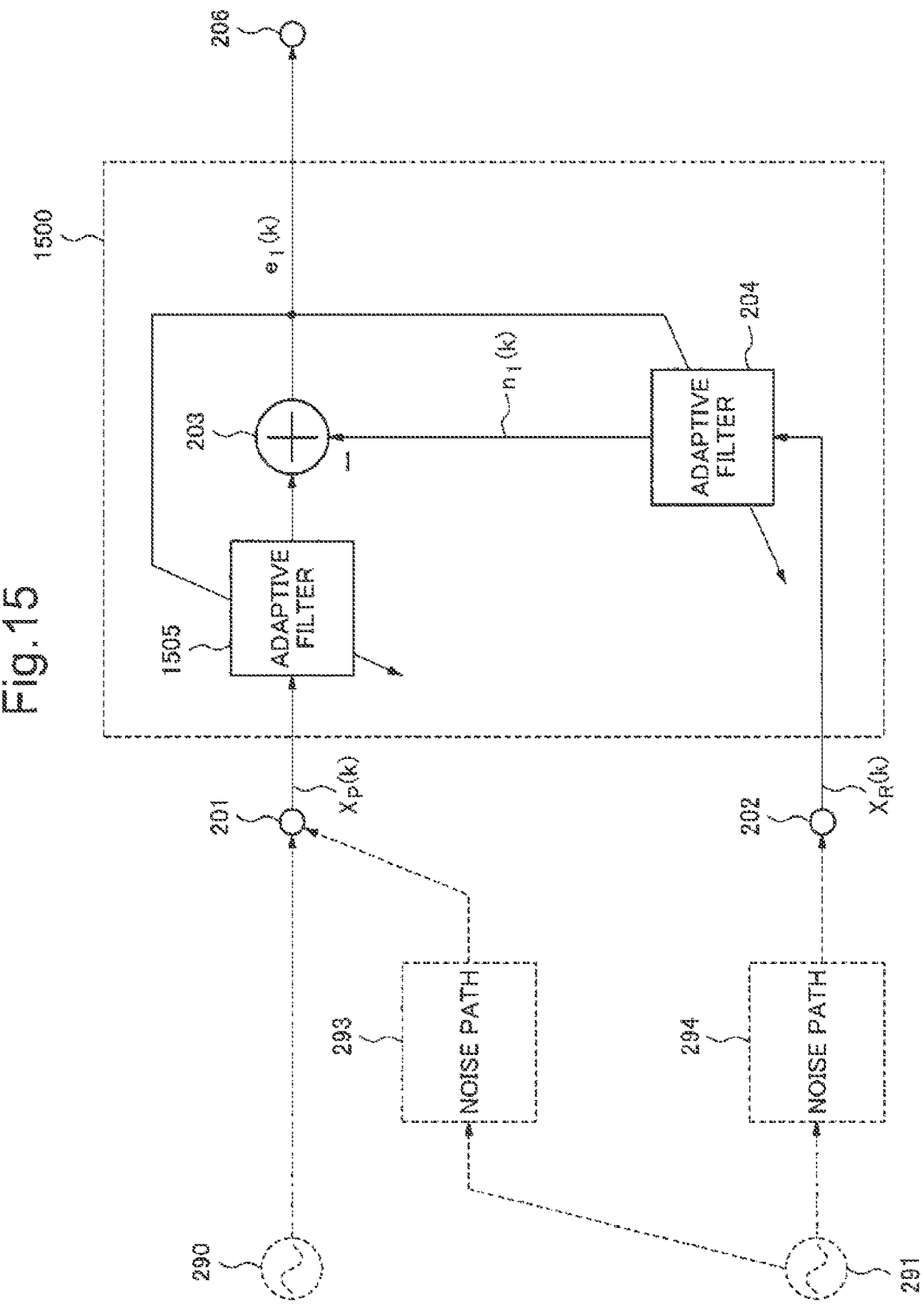

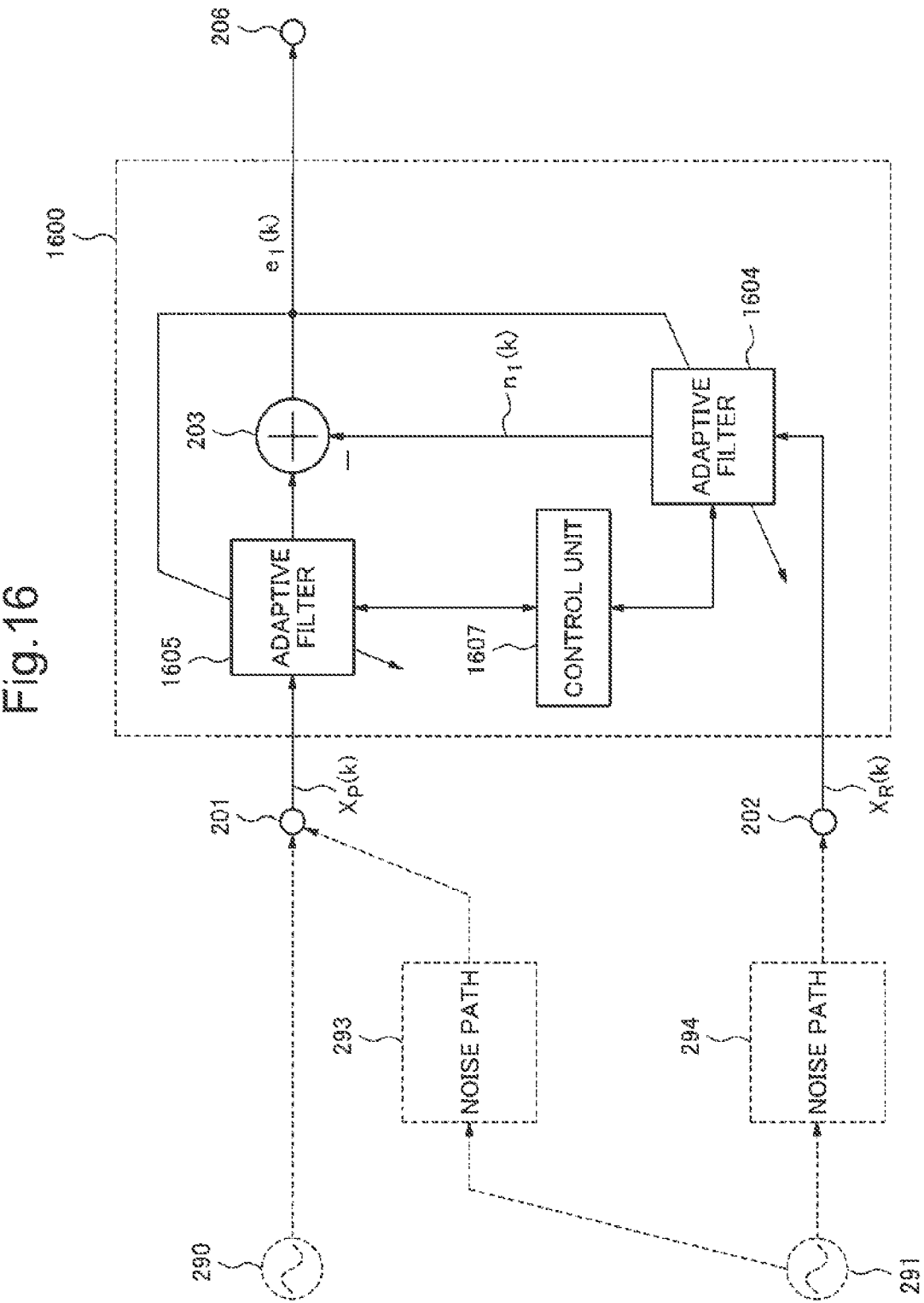

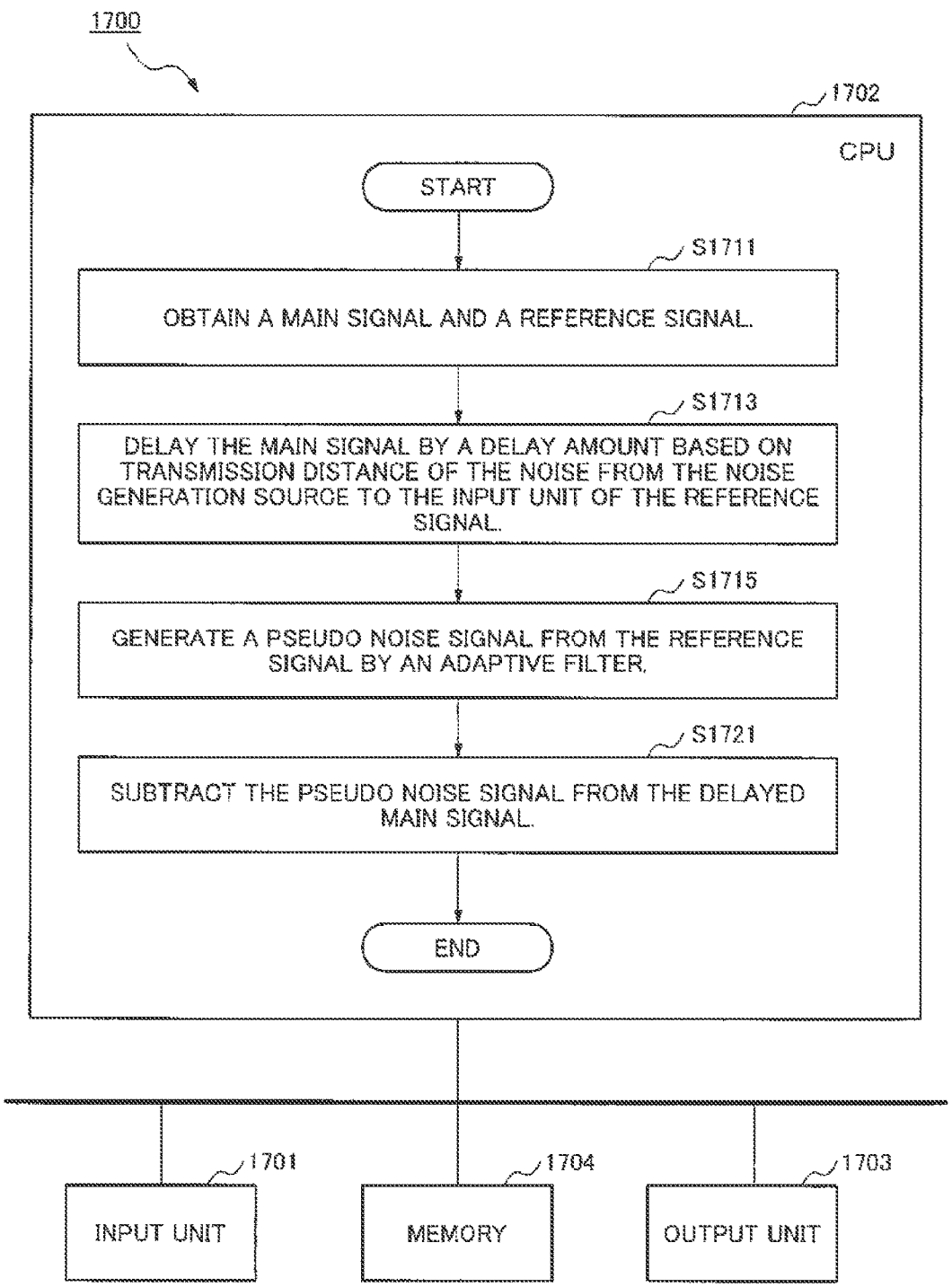

SIGNAL PROCESSING DEVICE, SIGNAL PROCESSING METHOD AND SIGNAL PROCESSING PROGRAM

CROSS REFERENCE TO RELATED APPLICATIONS

This application is a National Stage of International Application No. PCT/JP2011/072689 filed Sep. 26, 2011, claiming priority based on Japanese Patent Application No. 2010-230062 filed Oct. 12, 2010, the contents of all of which are incorporated herein by reference in their entirety.

TECHNICAL FIELD

The present invention relates to signal processing technology for cancelling noise, an interference signal and an echo which are mixed in a signal.

BACKGROUND ART

Background noise is often superposed on a voice signal inputted from a microphone or a hand set or the like, and it becomes a big problem when voice coding and voice recognition are performed. As a signal processing device which aimed at cancellation of acoustically superposed noise, a 2-input type noise cancellation device using an adaptive filter is disclosed by patent document 1.

The 2-input type noise cancellation device disclosed by patent document 1 uses the adaptive filter which approximates impulse response in a acoustic path (a noise path) from a noise source to the voice input terminal to generate pseudo-noise corresponding to noise components which are mixed in voice at the voice input terminal. And, by subtracting the pseudo-noise from a signal (a mixed signal) inputted to the voice input terminal, the noise cancellation device operates so that the noise components may be suppressed. Here, the mixed signal means a signal in which a voice signal and noise are mixed, and generally supplied from a microphone or a hand set to the voice input terminal. Further, a reference signal means a signal which has a correlation with the noise components in the noise source, and captured in the vicinity of the noise source. In this way, by capturing the reference signal in the vicinity of the noise source, it is possible to assume that the reference signal is approximately equal to the noise components in the noise source. To the adaptive filter, the reference signal supplied to a reference input terminal is inputted.

PRIOR ART DOCUMENT

Patent Document

[Patent document 1] Japanese Patent Application Publication No. 1996-241086

SUMMARY OF THE INVENTION

Problem to be Solved by the Invention

It is assumed that the above-mentioned 2-input type noise cancellation device captures the reference signal in the vicinity of the noise source. When the noise cancellation device cannot capture the reference signal in the vicinity of the noise source, influence of the impulse response, which is corresponding to a space transmission path (an additional noise path) from the noise source to a spatial position where the reference signal is captured, cannot be ignored. Specifically, due to delay of an input to the adaptive filter by this additional noise path, delay also occurs to the pseudo-noise, and enough noise cancellation by subtraction of the pseudo-noise from the mixed signal cannot be achieved.

The object of the present invention is to provide a technology which solves the above-mentioned problem.

Means for Solving a Problem

A signal processing device comprises: a first input means for obtaining a first mixed signal in which a first signal and a second signal are mixed; a second input means for obtaining a second mixed signal in which the first signal and the second signal are mixed in a different ratio from the first mixed signal; a delay means for generating a delayed first mixed signal by delaying the first mixed signal with a delay amount based on transmission distance from a generation source of the second signal to the second input means; a subtracting means for outputting an estimated first signal in which a pseudo second signal is subtracted from the delayed first mixed signal; and an adaptive filtering means for generating the pseudo second signal applying coefficients which are updated based on the estimated first signal to the second mixed signal.

A signal processing method comprises: obtaining a first mixed signal in which a first signal and a second signal are mixed; obtaining a second mixed signal in which the first signal and the second signal are mixed in a different ratio from the first mixed signal; generating a delayed first mixed signal by delaying the first mixed signal with a delay amount based on transmission distance from a generation source of the second signal until the second mixed signal being inputted; outputting an estimated first signal in which a pseudo second signal has been subtracted from the delayed first mixed signal; and generating the pseudo second signal applying coefficients which are updated based on the estimated first signal to the second mixed signal.

A signal processing program which causes a computer to execute the steps comprises: a step for obtaining a first mixed signal in which a first signal and a second signal are mixed; a step for obtaining a second mixed signal in which the first signal and the second signal are mixed in a different ratio from the first mixed signal; a step for generating a delayed first mixed signal by delaying the first mixed signal with a delay amount based on transmission distance from a generation source of the second signal until the second mixed signal being inputted; a step for outputting an estimated first signal in which a pseudo second signal has been subtracted from the delayed first mixed signal; and a step for generating the pseudo second signal applying coefficients which are updated based on the estimated first signal to the second mixed signal.

Effect of the Invention

According to the present invention, enough cancellation of the second signal can be achieved even when the second mixed signal cannot be captured in the vicinity of the second signal generation source.

BRIEF DESCRIPTION OF THE DRAWINGS

FIG. 15 is a block diagram showing a configuration of a signal processing device according to a tenth exemplary embodiment of the present invention.

FIG. 16 is a block diagram showing a configuration of a signal processing device according to an eleventh exemplary embodiment of the present invention.

FIG. 17 is a block diagram showing a configuration of a signal processing device according to another exemplary embodiment of the present invention.

EXEMPLARY EMBODIMENTS FOR CARRYING OUT THE INVENTION

The exemplary embodiments of the present invention will be described in detail exemplarily with reference to drawings below. However, the components mentioned in the following exemplary embodiments are persistently exemplification, and not the gist to limit the technological scope of the present invention to only those.

(First Exemplary Embodiment)

Figure 1:
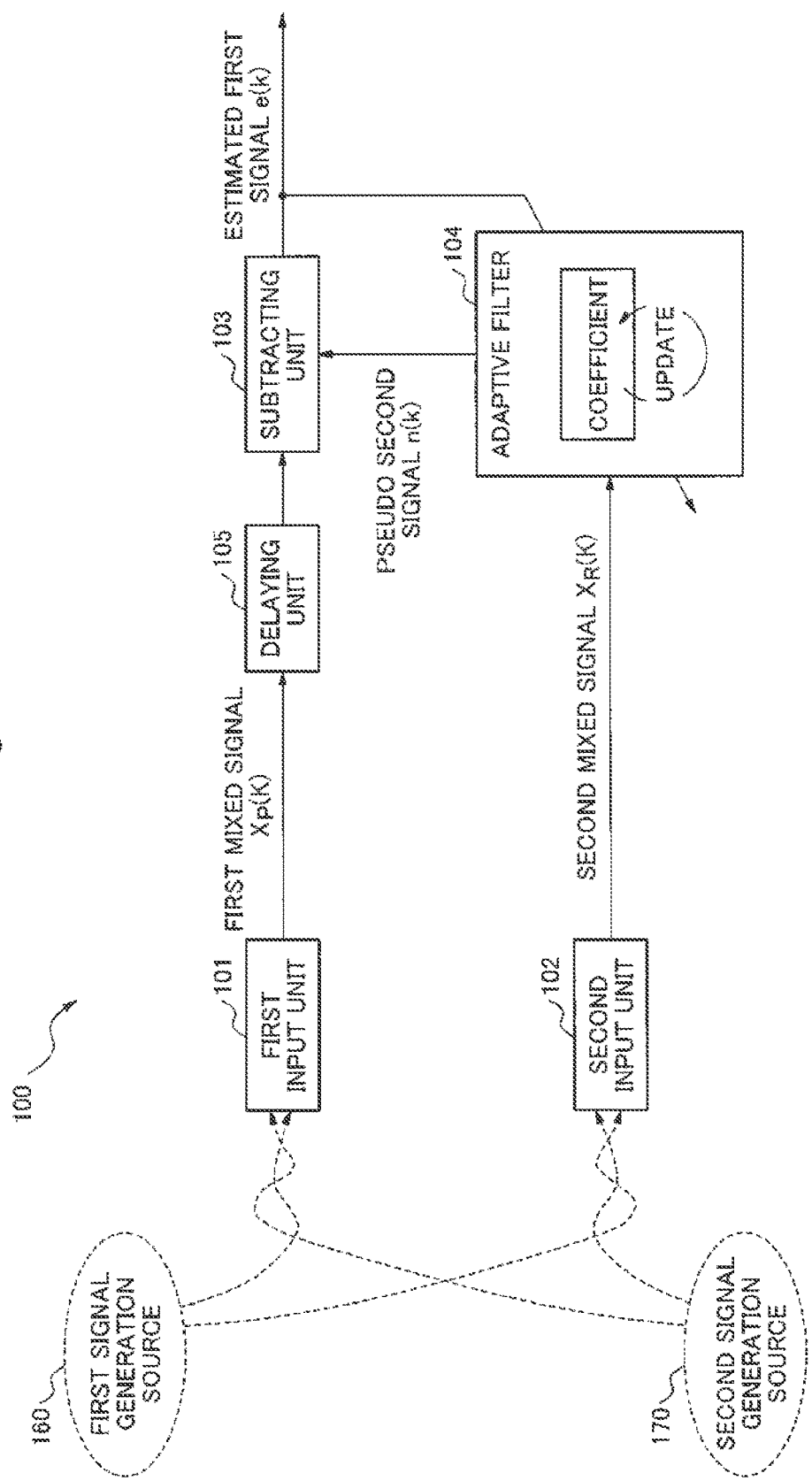
FIG. 1 is a block diagram showing a configuration of a signal processing device according to a first exemplary embodiment of the present invention.

A signal processing device 100 as the first exemplary embodiment of the present invention will be described using FIG. 1.

The signal processing device 100 includes the first input unit 101, the second input unit 102, the subtracting unit 103, the adaptive filter 104 and the delaying unit 105. Here, the first input unit 101 obtains the first mixed signal $x_P(k)$ in which the first signal from the first signal generation source 160 and the second signal from the second signal generation source 170 are mixed. Further, the second input unit 102 obtains the second mixed signal $x_R(k)$ in which the first signal and the second signal are mixed in a different ratio from the first mixed signal $x_P(k)$. Further, the delaying unit 105 delays the first mixed signal $x_P(k)$ to generate a delayed first mixed signal based on transmission distance from the generation source 170 of the second signal to the second input unit 102. The subtracting unit 103 subtracts a pseudo second signal n(k) which is estimated to be mixed in the first mixed signal $x_P(k)$ from the delayed first mixed signal $x_P(k)$, and outputs an estimated first signal e(k). Further, the adaptive filter 104 generates the pseudo second signal n(k) applying coefficients which is updated based on the estimated first signal e(k) to the second mixed signal $x_R(k)$.

According to the above mentioned configuration, it is possible to achieve enough cancellation of the second signal even when the second mixed signal cannot be captured in the vicinity of the generation source 170 of the second signal.

(Second Exemplary Embodiment)

Figure 2:
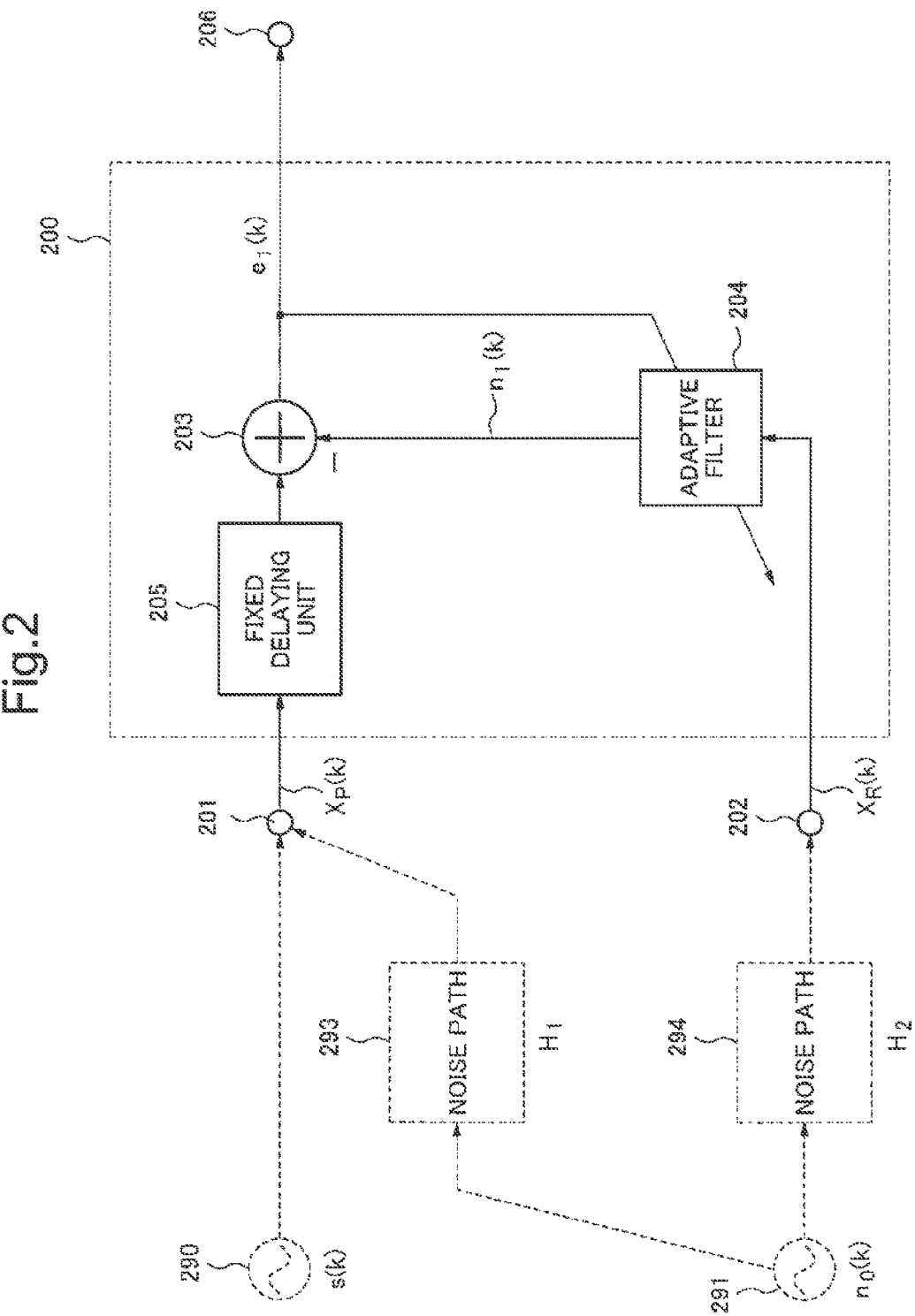
FIG. 2 is a block diagram showing a configuration of a signal processing device according to a second exemplary embodiment of the present invention.

As the second exemplary embodiment of the signal processing device according to the present invention, a noise cancellation device which cancels all or a part of the noise from a degradation signal (which is a signal in which a desired signal and the noise are mixed), and outputs an emphasized signal (which is a signal of which the desired signal has been emphasized) will be described. FIG. 2 is a block diagram showing an entire configuration of the noise cancellation device (noise canceller) 200. The noise cancellation device 200 functions also as a part of the devices such as digital cameras, laptop computers and cellular phones, however, the present invention is not limited to this, and is applicable to all information processing devices which are requested to perform noise cancellation from an input signal.

As shown in FIG. 2, the noise cancellation device 200 according to the present exemplary embodiment includes an adaptive filter 204, a subtracting unit 203 and a fixed delaying unit 205, cancels at least a part of the noise which is included in a signal inputted from input terminals 201 and 202, and outputs the result from an output terminal 206. Further, the noise cancellation device 200 operates under the environment in which there exist a desired signal source 290 as the generation source of the first signal, a noise source 291 as the generation source of the second signal and noise paths 293 and 294. Outline of the operation of this noise cancellation device 200 is transforming a signal which has a correlation with the noise to be cancelled by the adaptive filter and generating pseudo-noise, and canceling the noise by subtracting the pseudo-noise from the voice signal on which the noise is superposed. A characteristic of the embodiment is that the noise cancellation device 200 subtracts the pseudo-noise after delaying the voice on which the noise is superposed.

To the input terminal 201, a main signal (the first mixed signal) in which the voice and the noise are mixed is supplied as a sample value series, and the noise cancellation device 200 supplies the inputted main signal to the fixed delaying unit 205. The fixed delaying unit 205 delays the main signal for just D samples, and supplies the delayed main signal to the subtracting unit 203. Here, D is a natural number.

To the input terminal 202, a reference signal (the second mixed signal) which has a correlation with the noise is supplied as a sampled value series, and the noise cancellation device 200 supplies the inputted reference signal to the adaptive filter 204.

To the adaptive filter 204, the reference signal is supplied from the input terminal 202. The noise cancellation device 200 supplies the inputted reference signal to the adaptive filter 204. The adaptive filter 204 carries out the convolution operation of the reference signal and filter coefficients, and transmits the result to the subtracting unit 203 as the pseudo-noise.

To the subtracting unit 203, the main signal obtained from the input terminal 201 and being delayed for D samples is supplied. To the subtracting unit 203, the pseudo-noise is supplied from the adaptive filter 204. The subtracting unit 203 subtracts the pseudo-noise from the delayed main signal, and transmits the result to the output terminal 206 as an output and also feeds back to the adaptive filter 204 simultaneously.

The adaptive filter 204 updates the coefficients so that output power of the subtracting unit 203 will be minimized using the reference signal supplied from the input terminal 202 and the output fed back from the subtracting unit 203. As coefficient updating algorithm of such an adaptive filter, "LMS algorithm (Least Mean-Square Algorithm)" and "LIM (Learning Identification Method)" are disclosed by patent document 1. LIM is also called normalization LMS algorithm.

The signal processing can achieve enough cancellation even when the reference signal cannot be captured in the vicinity of the noise source. The reason why the signal processing can be realized by the fixed delaying unit 205 is as follows. First, it is supposed that the reference signal is denoted by $x_R(k)$, and the output of the adaptive filter 204 is denoted by $n_1(k)$. Also, the noise source signal is denoted by $n_0(k)$, the voice source signal is denoted by $s(k)$, the characteristic vector (impulse response) in the acoustic path (noise path 293) from the noise source to the input terminal 201 is denoted by $H_1$, and the characteristic vector (the impulse response) in the acoustic path (the noise path 294) from the noise source to the input terminal 202 is denoted by $H_2$. For convenience of description, it is assumed that these acoustic paths are time-invariant, and the sample number k corresponding to a concept of time is omitted. When taking $X_0(k)$ for a reference signal vector, $W(k)$ for a coefficient vector of the adaptive filter, M for the number of taps, $N_0(k)$ for a noise source signal vector composed of the time series samples of the noise source signal $n_0(k)$, $h_1(j)$, $j=0, 1, \ldots, M-1$ for factors of the characteristic vector in the noise path 293, and $h_2(j)$, $j=0$ and $1, \ldots, D-1$ for factors of the characteristic vector in the noise path 294, $X_0(k)$, $W(k)$, $N_0(k)$, $H_1$ and $H_2$ are expressed in the following formulas from (formula 0) to (formula 4).

$$X_0(k)=[x_R(k),x_R(k-1)\ldots,x_R(k-M+1)]^T \quad \text{(formula 0)}$$

$$W(k)=[w(k,0),w(k,1)\ldots,w((k,M-1)]^T \quad \text{(formula 1)}$$

$$N_0(k)=[n_0(k),n0(k-1)\ldots,n_0(k-M+1)]^T \quad \text{(formula 2)}$$

$$H_1=[h_1(0),h_1(1)\ldots,h_1(M-1)]^T \quad \text{(formula 3)}$$

$$H_2=[h_2(0),h_2(1)\ldots,h_2(D-1)]^T \quad \text{(formula 4)}$$

Here, $[\ ]^T$ expresses the transpose of a matrix.

The main signal $x_P(k)$, the output $n_1(k)$ of the adaptive filter 204, and the reference signal $x_R(k)$ are expressed in the following formulas from (formula 5) to (formula 7).

$$x_P(k)=s(k)+H_1^T*N_0(k) \quad \text{(formula 5)}$$

$$n_1(k)=W^T(k)*N_0(k) \quad \text{(formula 6)}$$

$$x_R(k)=H_2^T*N_0(k) \quad \text{(formula 7)}$$

When the reference signal can be captured in the vicinity of the noise source, the impulse response $H_2$ in the noise path 294 will be 1. In this case, when the fixed delaying unit 205 does not exist, the output $e_1(k)$ of the subtracting unit 203 can be expressed in the next (formula 8) using formulas from (formula 4) to (formula 7).

$$e_1(k)=x_P(k)-n_1(k)=s(k)+H_1^T*N_0(k)-W^T(k)*N_0(k)=s(k)+\{H_1^T-W^T(k)\}*N_0(k) \quad \text{(formula 8)}$$

That is, when $H_1^T=W^T(k)$ holds, $e_1(k)=S(k)$ holds, and the noise is cancelled.

In this way, the condition of the noise being cancelled is that the adaptive filter 204 has the same impulse response as the noise path 293. This represents that the electrical characteristics of the path to the subtracting unit 203 from the noise source 291 via the adaptive filter 204, and of the path to the subtracting unit 203 from the noise source 291 via the noise path 293 are equal. However, when the noise path 294 exists, this condition is not satisfied.

When the reference signal cannot be captured in the vicinity of the noise source, the impulse response $H_2$ in the noise path 294 will not be 1. For this reason, when the electrical characteristics of the path to the subtracting unit 203 from the noise source 291 via the noise path 294 and the adaptive filter 204, and of the path to the subtracting unit 203 from the noise source 291 via the noise path 293 are equal, the noise is cancelled completely. It is possible to cope with the influence on the frequency characteristic caused by the characteristic of the noise path 294, by changing the frequency characteristic of the adaptive filter 204. That is, it is possible to make the frequency characteristic of the path to the subtracting unit 203 from the noise source 291 via the noise path 294 and the adaptive filter 204 equal to the frequency characteristic of the path to the subtracting unit 203 from the noise source 291 via the noise path 293. However, by a change in the characteristic of adaptive filter, it is not possible to cope with the influence on the delay characteristic caused by the characteristic of the noise path 294. This is because the negative delay characteristic cannot be realized by the adaptive filter 204.

For this reason, according to the present exemplary embodiment, the fixed delaying unit 205 is introduced, and the influence on the delay characteristic caused by the characteristic of the noise path 294 is offset. That is, the fixed delaying unit 205 produces the delay which is sufficient to offset the influence on the delay characteristic caused by the characteristic of the noise path 294. As a result, it is possible to make the delay characteristic of the path to the subtracting unit 203 from the noise source 291 via the noise path 294 and the adaptive filter 204 equal to the delay characteristic of the path to the subtracting unit 203 from the noise source 291 via the noise path 293 and the fixed delaying unit 205. The fixed delaying unit 205 does not give any influences on the frequency characteristic. As a result, both of the frequency characteristics and the delay characteristics become equal respectively in the path to the subtracting unit 203 from the noise source 291 via the noise path 294 and the adaptive filter 204 and in the path to the subtracting unit 203 from the noise source 291 via the noise path 293 and the fixed delaying unit 205. As a result, the noise is cancelled completely at the output of the subtracting unit 203.

By the above mentioned configuration, according to the present exemplary embodiment, the noise cancellation device 200 subtracts the pseudo-noise after delaying the main signal. Because the noise cancellation device 200 delays the main signal according to the delay occurring to the pseudo-noise, it is possible to make the relative delay of the pseudo-noise to the main signal zero even when the reference signal cannot be captured in the vicinity of the noise source. For this reason, the noise cancellation device 200 can achieve enough noise cancellation even when the reference signal cannot be captured in the vicinity of the noise source.

(Third Exemplary Embodiment)

Figure 3:
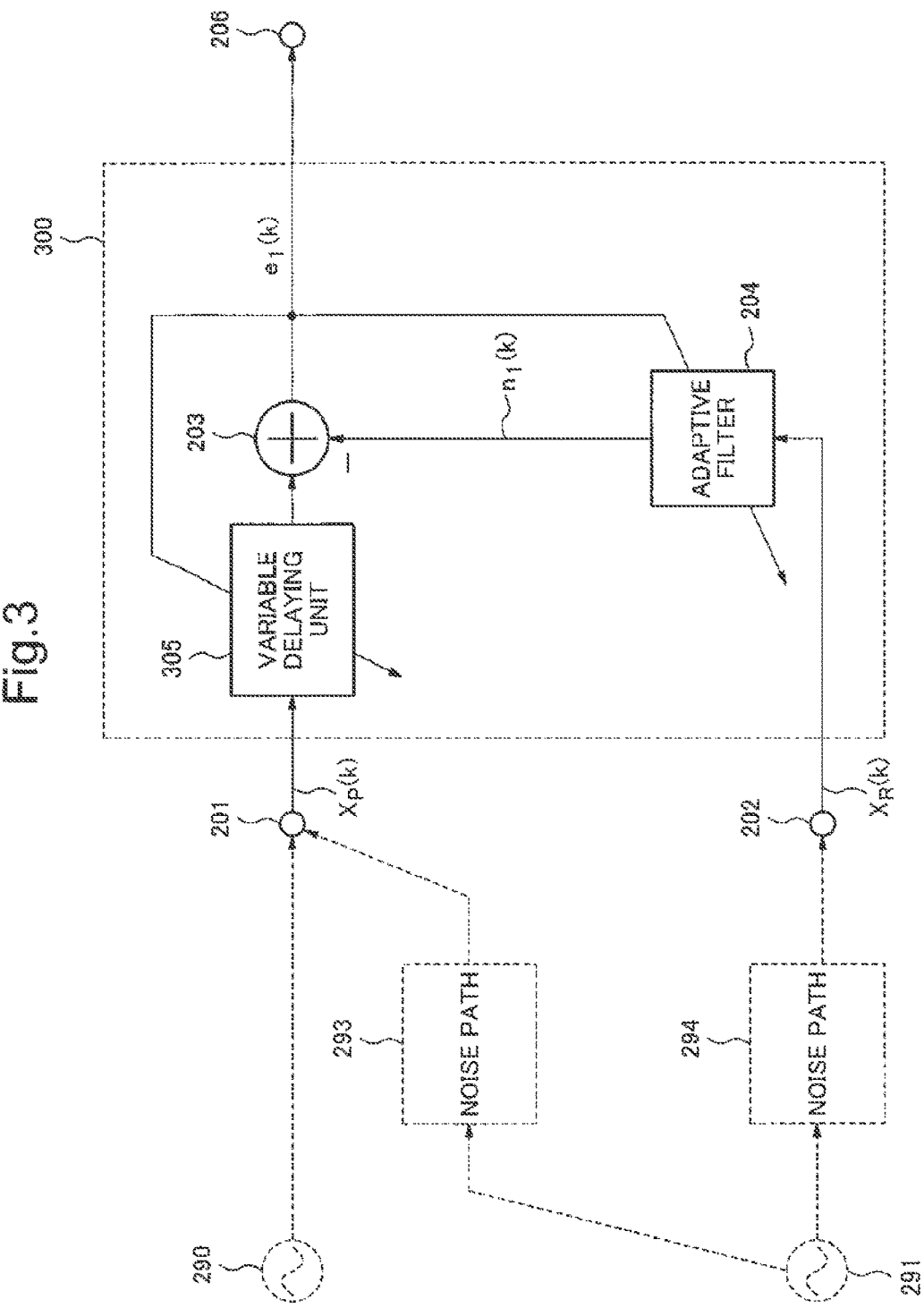
FIG. 3 is a block diagram showing a configuration of a signal processing device according to a third exemplary embodiment of the present invention.

A noise cancellation device 300 as the third exemplary embodiment of the signal processing device according to the present invention will be described using FIG. 3. When comparing with the second exemplary embodiment, the noise cancellation device 300 according to the present exemplary embodiment is different from the second exemplary embodiment in having a variable delaying unit 305 instead of the fixed delaying unit 205. Because other compositions except for those elements are same as those of the second exemplary embodiment, the same number is assigned to the same composition here and the description will be omitted.

The input terminal 201 supplies a main signal to the variable delaying unit 305. The variable delaying unit 305 delays the main signal supplied from the input terminal 201 for D samples, and supplies the result to the subtracting unit 203. An output of the subtracting unit 203 is fed back to the variable delaying unit 305. The variable delaying unit 305 adjusts the number of delay samples D so that output power of the subtracting unit 203 becomes a minimum using the main signal and the output of the subtracting unit 203.

Figure 4:
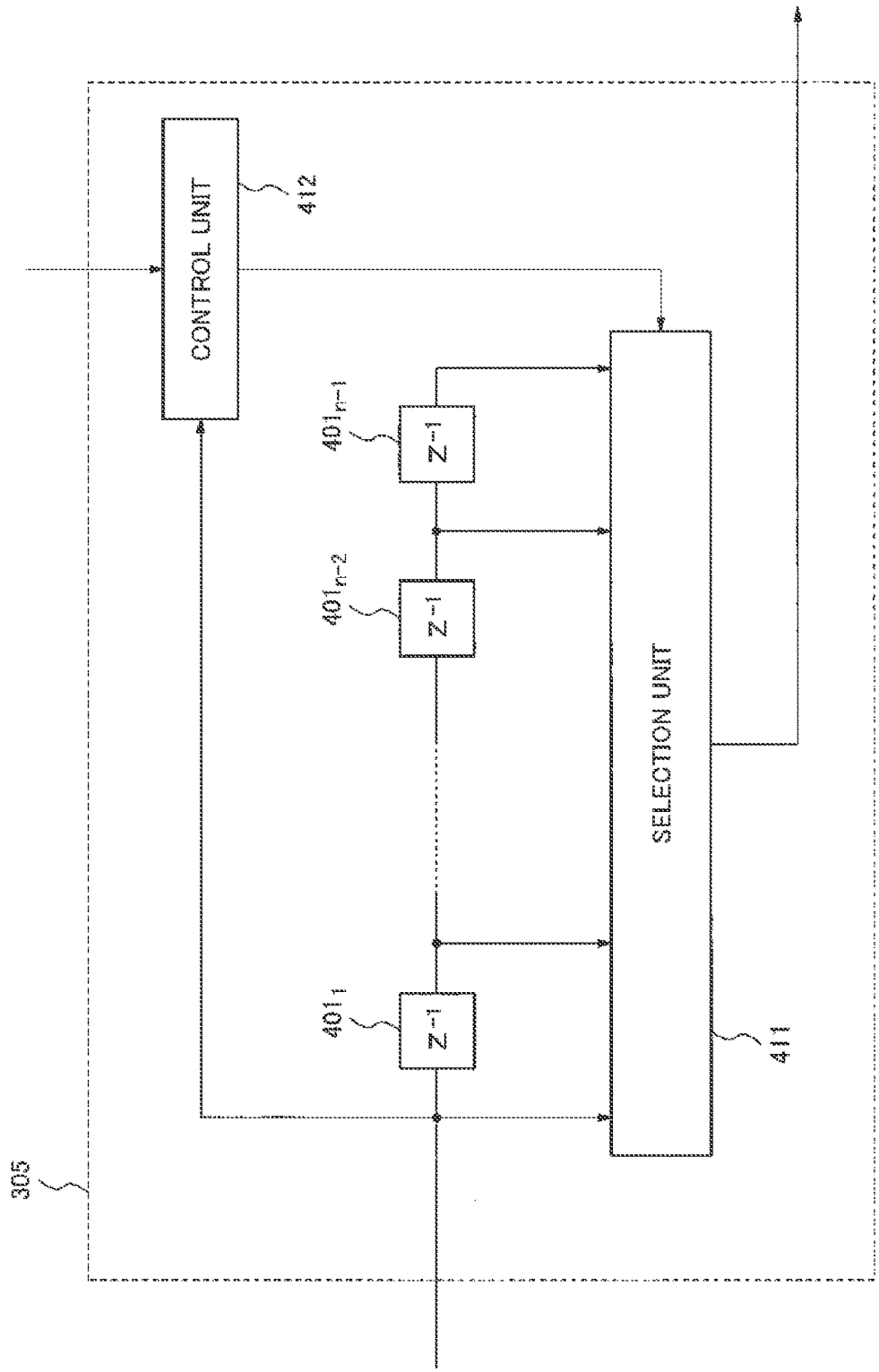
FIG. 4 is a block diagram showing a configuration of a variable delaying unit according to the third exemplary embodiment of the present invention.

An internal configuration of the variable delaying unit 305 is shown in FIG. 4. The variable delaying unit 305 includes delay elements $401_1$, $401_2$ ..., $401_{n-1}$, a selection unit 411 and a control unit 412. The delay elements $401_1$, $401_2$ ..., $401_{n-2}$ respectively delay a supplied signal for one sample, and supply the delayed signal to the next delay element. Also, the delay elements $401_1$, $401_2$ ..., $401_{n-1}$ supply outputs to the selection unit 411. The selection unit 411 selects one among the supplied signals and outputs the delayed signal. When the selection unit 411 selects the delay element $401_D$ and outputs the delayed signal, as a result, the variable delaying unit 305 delays the main signal for D samples.

The control unit 412 calculates the number of samples for which the variable delaying unit 305 should delay using the supplied signal, and supplies the information to the selection unit 411. The selection unit 411 selects an output of the delay element corresponding to the information supplied from the control unit 412, and performs output.

As the procedure for the control unit 412 to determine the number of samples D to be delayed, an adaptive delay filter (ADF: Adaptive Delay Filter), which is disclosed by D. M. Etter et al., "System Modeling Using an Adaptive Delay Filter," IEEE Transactions on Circuits and Systems, pp. 770-774, July 1987, can be used. The ADF observes errors using a plurality of delay in which gain is fixed, and selects the delay which corresponds to the error which is the most different from other errors. Because an arbitrary value can be set for gain at the time of determining the delay, when the gain is set to 1, the ADF can be applied to the present exemplary embodiment just as it is.

Further, the output of the subtracting unit 203 includes the voice which is unrelated to operation of the variable delaying unit 305. Accordingly, it may be preferable for the noise cancellation device 300 that the timing to control the variable delaying unit 305 and the adaptive filter 204 should be limited when the power of voice is small enough (in a case of a predetermined threshold value or less). By adapting such selective control to the variable delaying unit 305 and the adaptive filter 204, the noise cancellation device 300 can perform more accurate delay control and update of the adaptive filter coefficients.

The noise cancellation device 300 can judge whether the power of voice is small enough or not using SNR obtained by the SNR estimation method disclosed in patent document 1. When SNR is high, the voice power is larger than the noise power, and when SNR is low, the voice power is smaller than the noise power. SNR estimation methods are also known besides this, and the noise cancellation device 300 can detect a moment when the power of voice is small enough using any of those methods.

By the above mentioned configuration, according to the present exemplary embodiment, even when the reference signal cannot be captured in the vicinity of the noise source and a delay amount to the noise source is unknown, the signal processing in which the delay corresponding to the path to the input terminal 202 from the noise source can be estimated and enough noise cancellation can be achieved is possible to be realized.

(Fourth exemplary embodiment)

Figure 5:
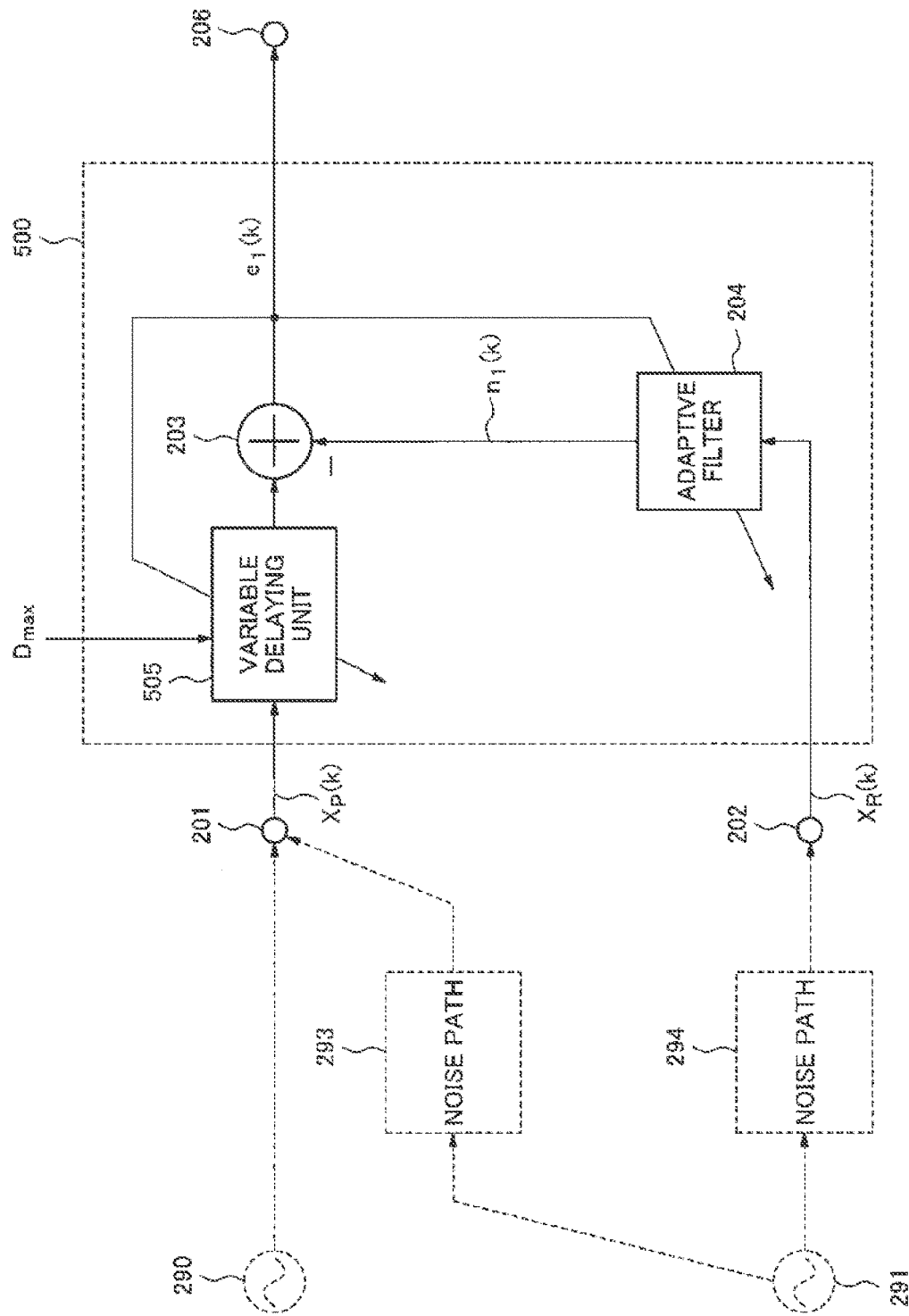
FIG. 5 is a block diagram showing a configuration of a signal processing device according to a fourth exemplary embodiment of the present invention.

A noise cancellation device 500 as the fourth exemplary embodiment of the signal processing device according to the present invention will be described using FIG. 5 and FIG. 6. When comparing with the third exemplary embodiment, the noise cancellation device 500 according to the present exemplary embodiment is different from the third exemplary embodiment in having a variable delaying unit 505 instead of the variable delaying unit 305. Because other compositions except for those elements are same as those of the third exemplary embodiment, the same number is assigned to the same composition here and the description will be omitted.

The maximum value of delay Dmax which can be set from outside is supplied to the variable delaying unit 505. The variable delaying unit 505 obtains the number of delay samples D by the same operation as the variable delaying unit 305, gives the delay corresponding to the value which is smaller between this value and the maximum value of delay Dmax to an input signal, and outputs the delayed signal.

Figure 6:
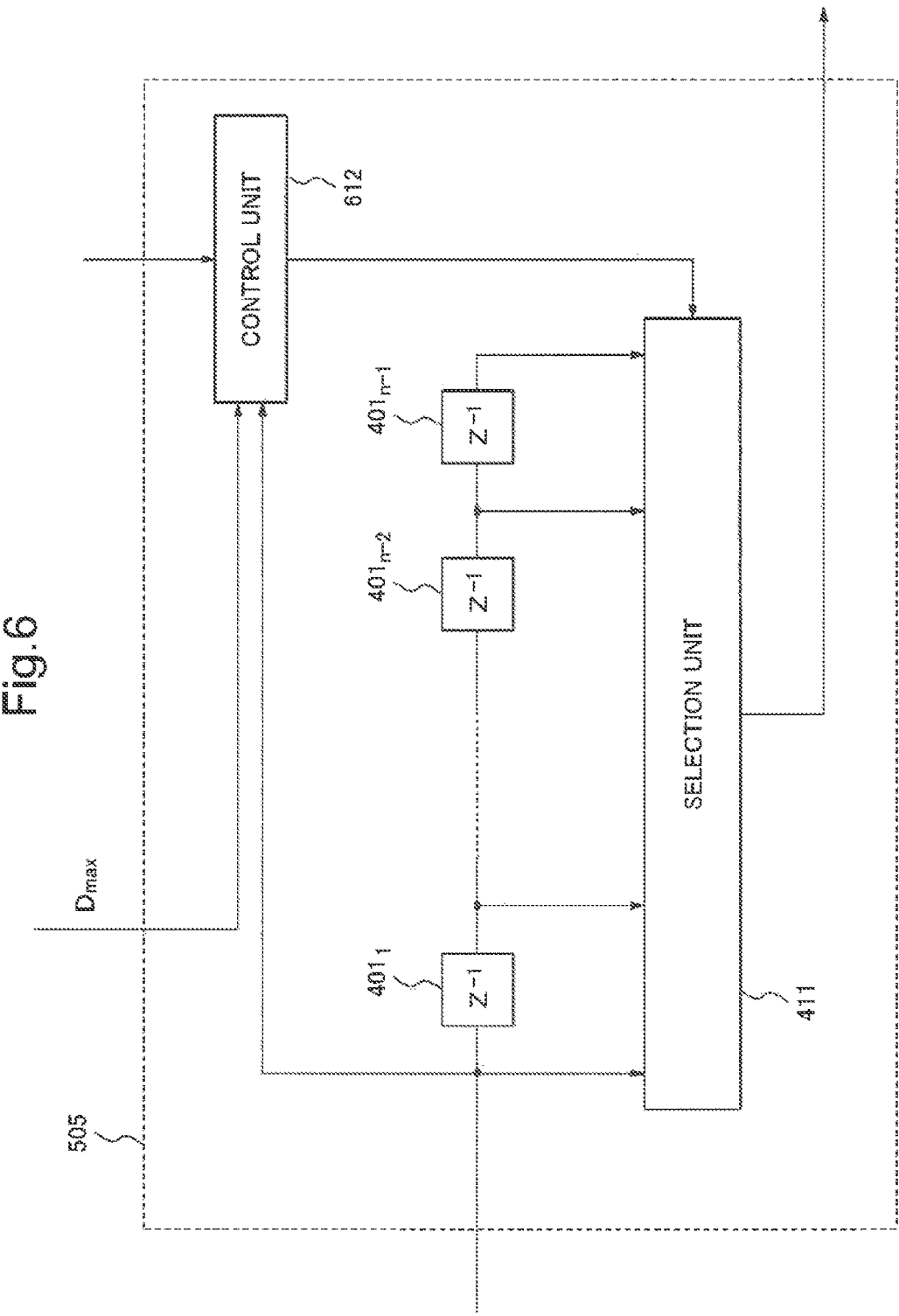
FIG. 6 is a block diagram showing a configuration of a variable delaying unit according to the fourth exemplary embodiment of the present invention.

An exemplary configuration of the variable delaying unit 505 is shown in FIG. 6. When comparing with the exemplary configuration of the variable delaying unit 305 shown in FIG. 4, the difference from the variable delaying unit 305 is that the control unit 412 is substituted by a control unit 612, and the maximum value of delay Dmax is supplied to the control unit 612. Because other compositions except for those elements are same as those of the variable delaying unit 305, the same number is assigned to the same composition here and the description will be omitted.

The control unit 612 calculates, using a supplied signal, the number of samples for which the variable delaying unit 505 should delay, and compares the number with Dmax which is the maximum value of delay. When the calculated delay is smaller than Dmax, the control unit 612 supplies the calculated delay to the selection unit 411, and when the calculated delay is larger than Dmax, supplies Dmax to the selection unit 411.

The variable delaying unit 505 limits an upper limit value of delay amount of the path to the output terminal 206 from the input terminal 201. Accordingly, the delay amount of the emphasized signal at the output terminal 206 can be reduced.

By the above mentioned configuration, according to the present exemplary embodiment, even when the reference signal cannot be captured in the vicinity of the noise source and a delay amount to the noise source is unknown, the noise cancellation device 500 can achieve enough noise cancellation by estimating the delay corresponding to the path to the input terminal 202 from the noise source and keeping the delay amount of the emphasized signal small.

(Fifth Exemplary Embodiment)

Figure 7:
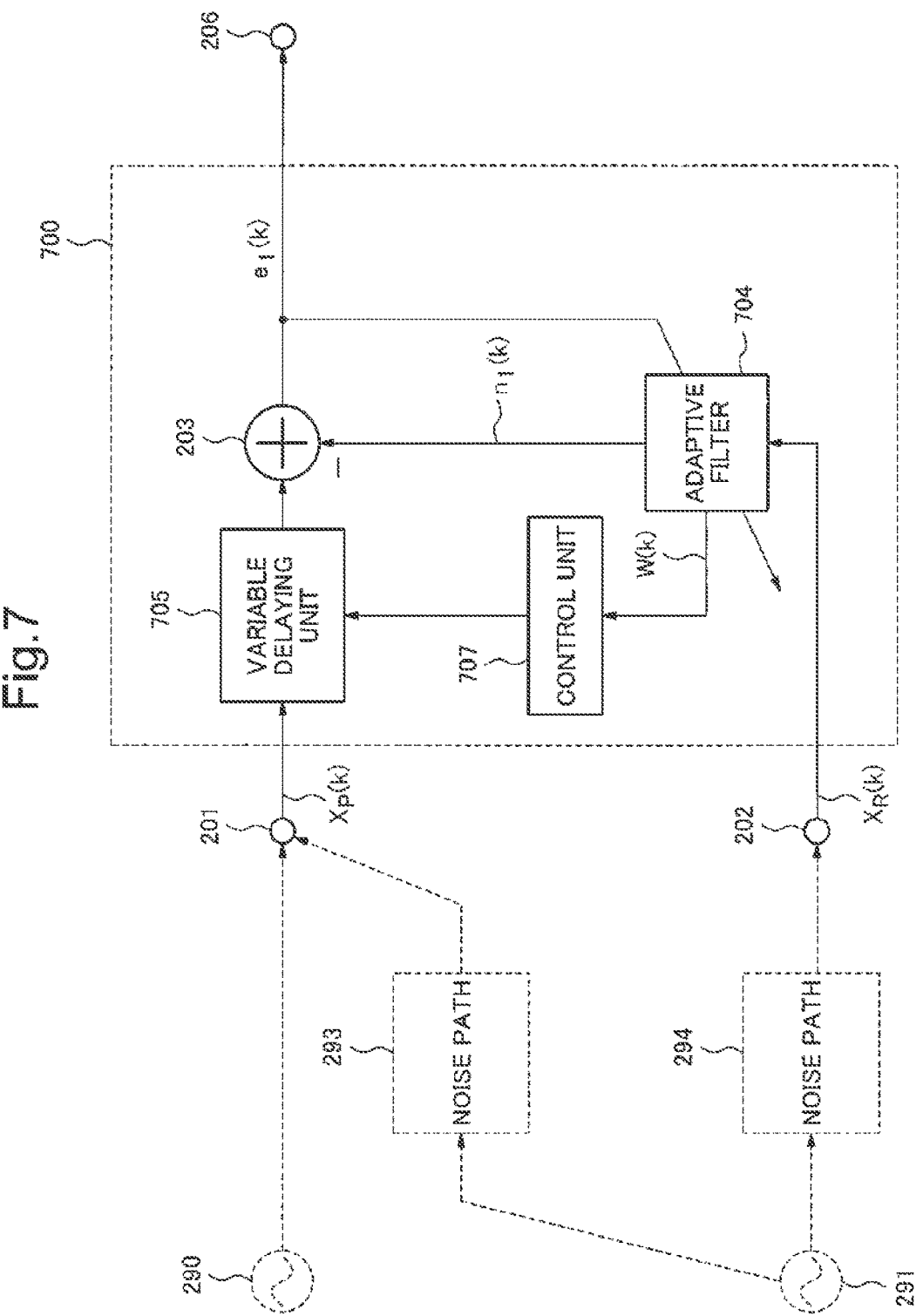
FIG. 7 is a block diagram showing a configuration of a signal processing device according to a fifth exemplary embodiment of the present invention.

A noise cancellation device 700 as the fifth exemplary embodiment of the signal processing device according to the present invention will be described using FIG. 7 and FIG. 8. When comparing with the third exemplary embodiment, the noise cancellation device 700 according to the present exemplary embodiment is different from the third exemplary embodiment in having a variable delaying units 705 instead of the variable delaying unit 305 and further having a control unit 707. Because other compositions except for those elements are same as those of the third exemplary embodiment, the same number is assigned to the same composition here and the description will be omitted.

Figure 8:
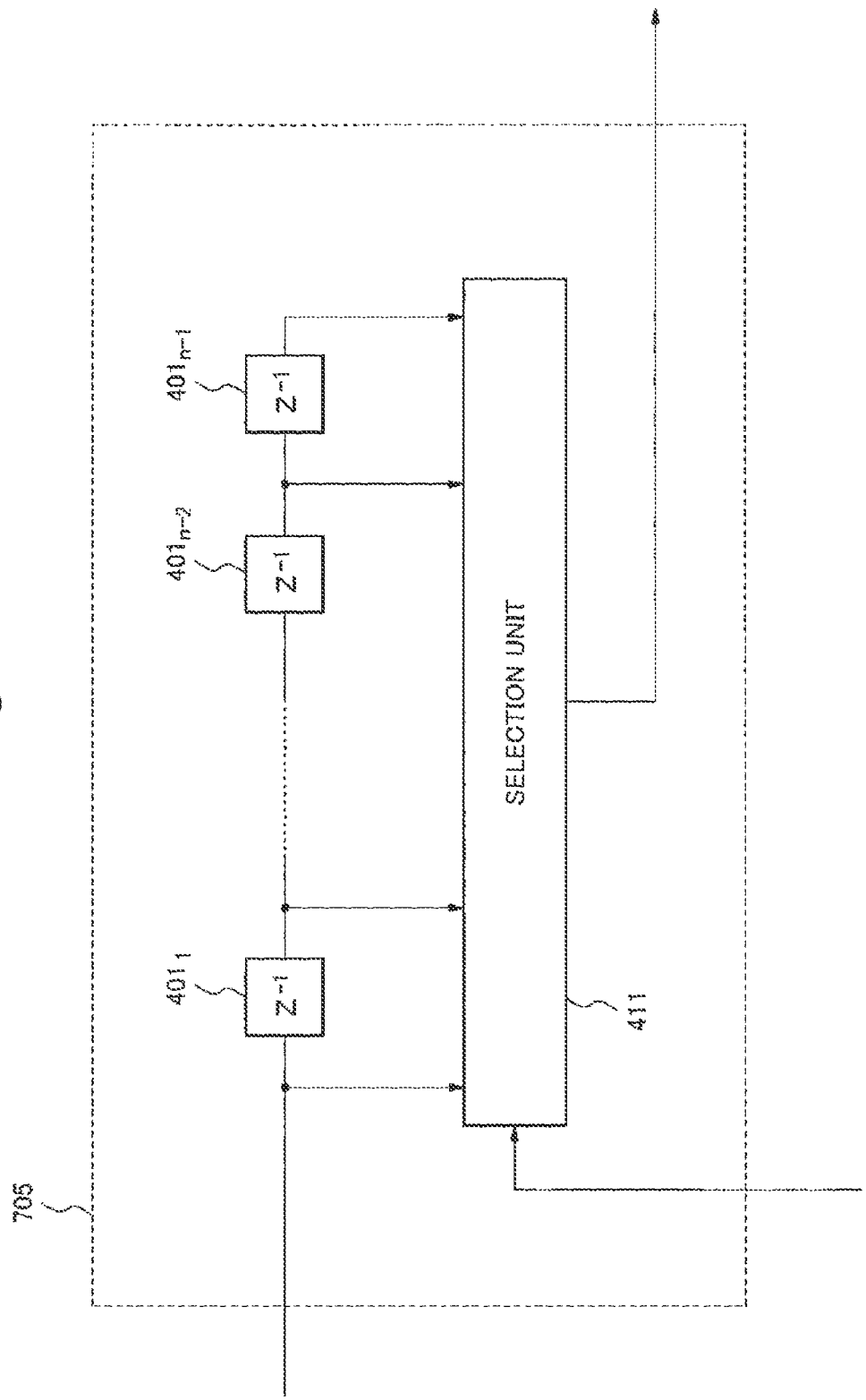
FIG. 8 is a block diagram showing a configuration of a variable delaying unit according to the fifth exemplary embodiment of the present invention.

An exemplary configuration of the variable delaying unit 705 is shown in FIG. 8. The variable delaying unit 705 has a configuration in which the control unit 412 is deleted from the variable delaying unit 305 shown in FIG. 4. The control signal for the selection unit 411, which was supplied by the control unit 412, is supplied from outside directly. The control unit 707 which is on the outside of the variable delaying unit 705 realizes the function of the control unit 412. The control unit 707 receives a filter coefficient vector W(k) from the adaptive filter 704, obtains the most suitable number of delay samples D, and supplies this to the variable delaying unit 705.

Next, the process that the control unit 707 determines the number of delay samples D(k) using the filter coefficient vector W(k) will be described. For convenience of description, it is assumed that the number of taps M of the filter coefficient vector W(k) is equal to the number of taps of the impulse response in the noise path 293.

When the number of delay samples D which the variable delaying unit 705 gives is equal to the number of delay samples corresponding to the noise path 294, the coefficient values of the adaptive filter 704 agrees with the impulse response in the noise path 293. Further, when D is larger than the number of delay samples corresponding to the noise path 294, the coefficient value of the adaptive filter 704 will be zero in the head (the part corresponding to an input signal sample having small delay). At the same time, the tail of the impulse response in the noise path 293 is not realized in the adaptive filter 704. Further, when D is smaller than the number of delay samples corresponding to the noise path 294, the coefficient values of the adaptive filter 704 agrees with a part except for the head of the impulse response in the noise path 293. That is, the head of the impulse response in the noise path 293 is not realized in the adaptive filter 704. Accordingly, when the number of taps of the adaptive filter 704 and the number of taps of the impulse response in the noise path 293 are equal, the noise amount cancelled in the output of the subtracting unit 203 becomes largest when the number of delay samples which is given to the variable delaying unit 705 is equal to the number of delay samples corresponding to the noise path 294. In other words, perfect noise cancellation is achieved.

Accordingly, when the value of D is increased by the variable delaying unit 705, corresponding to the increment, a portion of the impulse response in the noise path 293 covered by the adaptive filter 704 shifts to the left (the direction toward delay being decreased). On the contrary, when the value of D decreases, corresponding to the decrement, a portion of the impulse response in the noise path 293 covered by the adaptive filter 704 shifts to the right (the direction toward increase in delay).

When increasing in the value of D, instead of the coefficient of the tail in the impulse response in the noise path 293 having been covered by the adaptive filter 704 up to now, the adjacent coefficient on the left of the head of the same impulse response will be covered by the adaptive filter 704. The noise cancelling amount per one coefficient is proportional to the coefficient absolute value when input signal sample values are identical. That is, when the adjacent coefficient absolute value on the left of the head is larger than the coefficient absolute value of the tail, the noise cancelling amount will be increased, and when smaller, the noise cancelling amount will decrease.

Similarly, when the value of D decreases, instead of the coefficient of the head of the impulse response in the noise path 293 having been covered by the adaptive filter 704 up to now, the adjacent coefficient on the right of the tail of the same impulse response will be covered by the adaptive filter 704. That is, when the adjacent coefficient absolute value on the right of the tail is larger than the coefficient absolute value of the head, the noise cancelling amount will increase, and when smaller, the noise cancelling amount will decrease.

The following will be found by summarizing these. The control unit 707 compares the absolute value of the coefficient which will not be covered any more by the adaptive filter 704 and the absolute value of the coefficient which will be newly covered depending on increase or decrease of D, and maximizes the noise cancelling amount by the adaptive filter 704 to cover the coefficient corresponding to the larger coefficient absolute value.

By applying this way of thinking, the control unit 707 determines the number of delay samples D(k) in the present exemplary embodiment. As already described, essentially, the control unit 707 should compare the coefficient absolute value which will not be covered any more by the adaptive filter 704 and the coefficient absolute value which will be newly covered. However, the latter value is unknown at the time of determination of the number of delay samples. For this reason, the control unit 707 substitutes the coefficient value of the head and the coefficient value of the tail of the adaptive filter 704 as estimated values for these values. Specifically, the control unit 707 compares the head coefficient value and the tail coefficient value of the adaptive filter 704 by the absolute values of those, and judges the larger one to be more important and to contribute to noise cancellation greatly. It is known that envelopes of the impulse response in the noise path 293 and the coefficient absolute values of the adaptive filter 704 which approximates that attenuate smoothly. Accordingly, when the head coefficient value of the adaptive filter 704 is larger than the tail coefficient value, it is expected that the coefficient value of the left side of the head (the side of small delay in impulse response) is larger than the coefficient value of the right side of the tail (the side of large delay in impulse response). Because of this, the control unit 707 evaluates the size of the head coefficient value and the tail coefficient value of the adaptive filter 704, and judges which side the new coefficient is to be placed.

Taken together, in the present exemplary embodiment, the control unit 707 evaluates the contribution (=importance) of the head coefficient and the tail coefficient of the adaptive filter 704 to the noise cancellation, and controls the variable delaying unit 705 so that D(K) will be increased when the head is more important, and D(k) will be decreased when the tail is important. As an index of this importance, a coefficient absolute value, a coefficient squared value, a time average value of these, further, a spatial average value, an adjacent coefficient value (coefficient which is outside the range currently covered by the adaptive filter), or combination of these may be used.

Up to now, for convenience of description, the present exemplary embodiment has been described by assuming that the number of taps M of the filter coefficient vector W(k) is equal to the number of taps of the impulse response in the noise path 293. When this assumption is not concluded and the adaptive filter 704 has the number of taps Mo which is over M (Mo>M), the coefficient value other than M taps converges on zero. Further, when having only the number of taps Mu which is below M (Mu<M), the coefficient absolute values of the head and the tail of the adaptive filter 704 will be the value of zero or more. In the latter case, because the coefficients of the adaptive filter 704 are insufficient, to achieve the maximum noise cancelling amount by the limited number of coefficients is the problem. In any case, similar to the case that the number of taps of the adaptive filter 704 is equal to the number of taps of the impulse response in the noise path 293, the control unit 707 evaluates the sizes of the head coefficient value and the tail coefficient value of the adaptive filter 704, and judges which side the new coefficient is to be placed on.

[Comparison in Size Between Head Coefficient and Tail Coefficient, and Calculation of Delay: Method by Summation Comparison by Coefficient Squared Value or Absolute Value]

With respect to a specific method of size comparison about partial coefficients of a plurality of adaptive filters, Japanese Patent Application Publication No. 1994-318885 is can be referred to. Japanese Patent Application Publication No. 1994-318885 discloses a method, in a band division adaptive filter, to perform size comparison of the tail coefficient values of the adaptive filter between the different adaptive filters in two bands. In this method, instead of the tail coefficient values of 2 adaptive filters, size comparison can be performed to the head coefficient values and the tail coefficient values of the adaptive filter 704 in the present exemplary embodiment.

Specifically, the control unit 707 obtains the coefficient squared summation about respective p taps of the head filter coefficient and the tail filter coefficient of the adaptive filter 704, and compares those. Here, p is a natural number. When p=1, the control unit 707 compares the squared value of the head coefficient and the squared value of the tail coefficient. In the comparison of those, instead of the coefficient squared value, the coefficient absolute value may be used. As p becomes larger, the effect to compensate dispersion from an envelope of filter coefficient becomes large, and the control unit 707 can perform stable comparison.

Further, Japanese Patent Application Publication No. 1994-318885 also discloses a method which compares after taking a time average of the above-mentioned coefficient squared value summation. By applying the averaging operation, the influence by statistical uncertainty of the coefficient values can be reduced, and accurate number of delay samples D can be obtained.

[Comparison in Size Between Head Coefficient and Tail Coefficient, and Calculation of Delay: Method by Envelope Slope of Coefficient Squared Values or Absolute Values]

The calculation of the number of delay samples D described so far is performed using the coefficient values of the head and the tail of the adaptive filter 704. The control unit 707 can also perform calculation of the number of delay samples D by estimating the coefficient value to be newly placed from a coefficient envelope slope. The envelope may be an envelope of the coefficient absolute values or an envelope of the coefficient squared values. When applying the coefficient envelope slope to the head coefficient and the tail coefficient of the adaptive filter 704, the control unit 707 can obtain estimated values of the adjacent coefficient value on the left of the head and the adjacent coefficient value on the right of the tail.

Specifically, the control unit 707 subtracts the envelope slope of the coefficient squared values or the coefficient absolute values (a changed portion of the coefficient squared values or the coefficient absolute values which corresponds to one tap) from the squared value or the absolute value of the head coefficient or the tail coefficient. From this, the control unit 707 obtains the estimated value of the adjacent coefficient squared values or the adjacent coefficient absolute values on the left of the head and on the right of tail. The larger estimated value between those is the coefficient that should be newly covered according to increase or decrease of the number of delay samples D. D is increased when the coefficient is in the head side of the adaptive filter 704, and D is decreased when the coefficient is in the tail side.

Further, when any of new coefficient estimated values of the head and the tail is larger than any of current coefficient values of the head and the tail, the control unit 707 determines the value of D so that the adaptive filter 704 newly covers the larger coefficient value.

The control unit 707, when obtaining the estimated values of the adjacent coefficient value on the left of the head and the adjacent coefficient value on the right of tail, needs the coefficient value of the head and the coefficient value of the tail in addition to the envelope slope. As those values, the coefficient squared values or the coefficient absolute values of the head and the tail of the adaptive filter 704 at that time may be used. Further, when considering that the coefficient values themselves are changing, the estimation accuracy of the coefficient value can be made high by using a time average of absolute values of those.

It is also effective for the control unit 707 to take not only a time average but also a spatial average (an average in the tap direction of filter). For example, the control unit 707 takes averages of the coefficient squared values or the coefficient absolute values of p taps of the head and the tail, and can take those as values the estimated values of the coefficient value of the head and the coefficient value of the tail. Further, because such average values represent the coefficient values located in the middle of the p taps which are the subjects of calculation, the control unit 707 can use them, after further performing compensation using the coefficient envelope slope, as the estimated values of the coefficient value of the head and the coefficient value of the tail. The specific compensation using a slope can be performed by the next procedure.

The control unit 707 averages the coefficient squared values or the absolute values for p taps first, and obtains an estimated value of the coefficient squared value or the absolute value located in the middle of the p taps. The control unit 707 subtracts the product of the envelope slope of the coefficient squared value or the absolute value and p/2 from that estimated value, and takes that as the coefficient squared value or the coefficient absolute value of the header and the tail of the adaptive filter 704. When further subtracting the coefficient envelope slope from those coefficient values, the control unit 707 can obtain the estimated values of the adjacent coefficient value on the left of the head and the adjacent coefficient value on the right of the tail.

Further, in the procedure for obtaining the estimated values of the coefficient value of the head and the coefficient value of the tail, instead of subtracting the product of the envelope slope of the coefficient squared value or the absolute value and p/2, the control unit 707 can subtract the product of the slope and p/2+1. By using this subtraction result, the control unit 707 can obtain the estimated values of the adjacent coefficient value on the left of the head and the adjacent coefficient value on the right of tail directly, and can achieve reduction in the amount of operation.

[Estimation Method of Coefficient Envelope]

The envelope of the coefficient squared value or the coefficient absolute value can be obtained by the next procedure. First, the control unit 707 obtains averages for p taps in regard to the coefficient squared value or the coefficient absolute value of the head and the tail of the adaptive filter 704. The control unit 707 further performs the same calculation to the adjacent p taps. The control unit 707 obtains differences between those two average values for the head side and the tail side respectively, and, by dividing those by p, can obtain the envelopes of the coefficient squared values or the coefficient absolute values of the head side and the tail side.

Or, the control unit 707 obtains a regression curve corresponding to the coefficient squared values or the coefficient absolute values for those p taps, and can take the regression curve as an envelope. Although the degree of the regression curve can be set to one among various values, a slope of the line obtained by primary approximation of the regression curve will be the envelope slope to be obtained.

Further, in calculation of the regression curve, it is also possible for the control unit 707 to obtain the regression curves by separately handling the set of the coefficient squared values or the coefficient absolute values obtained from the positive coefficient values and the set obtained from the negative coefficient values in advance, and takes the regression curve which is obtained by integrating or selecting those as an envelope.

Further, the control unit 707 can also obtain envelopes by dividing, by p, differences between the coefficient squared values or the coefficient absolute values of the both ends of sections of p taps when selecting them at the head and the tail of the adaptive filter 704. The control unit 707 can exclude the influence of statistical uncertainty of the coefficient values by using time averages of the coefficient squared values or the coefficient absolute values of the both ends. This method is characterized by being the easiest calculation method whose amount of operation is little.

[Initial Value of Delay and Faster Convergence]

When estimation of the number of delay samples D is started, it is preferable to take the initial value as half of the number of taps which the adaptive filter 704 has, that is, M/2. This is the initial value which can cope with equally even if a range covered by the adaptive filter 704 moves to the right or moves to the left due to a change in D. When an estimated value of the value of D is obtained beforehand, it is preferable to take the estimated value as the initial value. Further, when the maximum value of delay Dmax is given, it is preferable to take Dmax/2 which is the middle of 0 and Dmax as that.

It is desirable that the required time (convergence time) for the number of delay samples D starting from the initial value to reaching an optimum value is as short as possible. With respect to reduction of the convergence time, a problem of allocating the most suitable number of taps in a band division adaptive filter is disclosed by Japanese Patent Application Publication No. 1996-079137 and Japanese Patent Application Publication No. 1999-355182. Also in the present exemplary embodiment, a method disclosed by Japanese Patent Application Publication No. 1996-079137 and Japanese Patent Application Publication No. 1999-355182 can be applied to the coefficients of the head and the tail of the adaptive filter 704 just as it is.

Japanese Patent Application Publication No. 1996-079137 discloses the method which controls the number of coefficients to be reallocated at one time (the number of reallocation) using deviation of the band division adaptive filter (band) to which the coefficients are allocated. When the coefficients are allocated to a specific adaptive filter (band) successively, the number of reallocation is increased, and when the number of adaptive filters (band) to which the coefficients are allocated changes on the average, the number of coefficients to be reallocated is decreased.

According to the present exemplary embodiment, when the number of delay samples D continuously increases or decreases, the amount of change in D is increased, and on the contrary, when D increases or decreases but does not change continuously into one direction, the amount of change in D is decreased. The minimum value of the amount of change in D is 1, and the maximum value can be set to an arbitrary value. Further, instead of observing a continuous change, the control unit 707 can evaluate the probability of change to one direction. For example, in continuous changes of 10 times, if D increases 7 times or more (probability of 0.7 or more), the control unit 707 increases the amount of change, and decreases the amount of change when 7 times or less.

Japanese Patent Application Publication No. 1999-355182 discloses a method for obtaining an envelope of the coefficient values, estimating the most suitable number of coefficients using the envelope slope, and taking that to be the temporary most suitable number of coefficients. The envelope may be an envelope of the coefficient absolute values or an envelope of the coefficient squared values. The number of coefficients is further optimized using that temporary most suitable number of coefficients as an initial value. Until the temporary most suitable number of coefficients is obtained, another initial value is used and allocation of the coefficients is performed.

The noise cancellation device 700 of the present exemplary embodiment obtains the envelopes of the coefficients of the head and the tail of the adaptive filter 704, and estimates the number of additionally required coefficients using the envelope slope. The noise cancellation device 700 can obtain the number of additionally required coefficients from the position where the envelope intersects with zero. The noise cancellation device 700 obtains the number of additionally required coefficients for the head and the tail in that way. The averaged of the two values obtained in that way will be an optimum value of the number of delay samples D. Accordingly, the noise cancellation device 700 sets that to the initial value, and starts to optimize D once again.

Further, instead of an average of both, the noise cancellation device 700 can also determine D with which contribution to actual noise cancellation becomes the biggest. In this case, the noise cancellation device 700 calculates the area surrounded with the envelope and a horizontal axis using the numbers of additionally required coefficients which correspond to the head and tail, and takes the value to which that area is approximately equal as the number of additionally required new coefficients. The noise cancellation device 700 takes an average of these values, and starts to optimize D once again using the average value as the value of number of delay samples D.

Further, in the calculation of obtaining an average value described here, the number of additionally required coefficients at the tail is used as the negative value, and the number of additionally required coefficients at the head is used as the positive value. This is because that the impulse response covered by the adaptive filter 704 moves to the left side of the head when the value of D increases, and moves to the right side of the tail when the value of D decreases.

As already described in the third exemplary embodiment, the noise cancellation device 700 may limit the timing for controlling the variable delaying unit 705 and the adaptive filter 204 within the case when the power of voice is small enough. The noise cancellation device 700 can perform more accurate control of delay and update of the adaptive filter coefficients by applying such selective control to the variable delaying unit 705 and the adaptive filter 704.

Further, the noise cancellation device 700 can also apply acceleration of convergence selectively. For example, when acceleration is applied and the amount of change of D becomes small, the noise cancellation device 700 fixes the amount of change of D on 1. In that way, the noise cancellation device 700 can stably perform estimation of delay in a short time by applying acceleration only in an early stage.

(Sixth Exemplary Embodiment)

Figure 9:
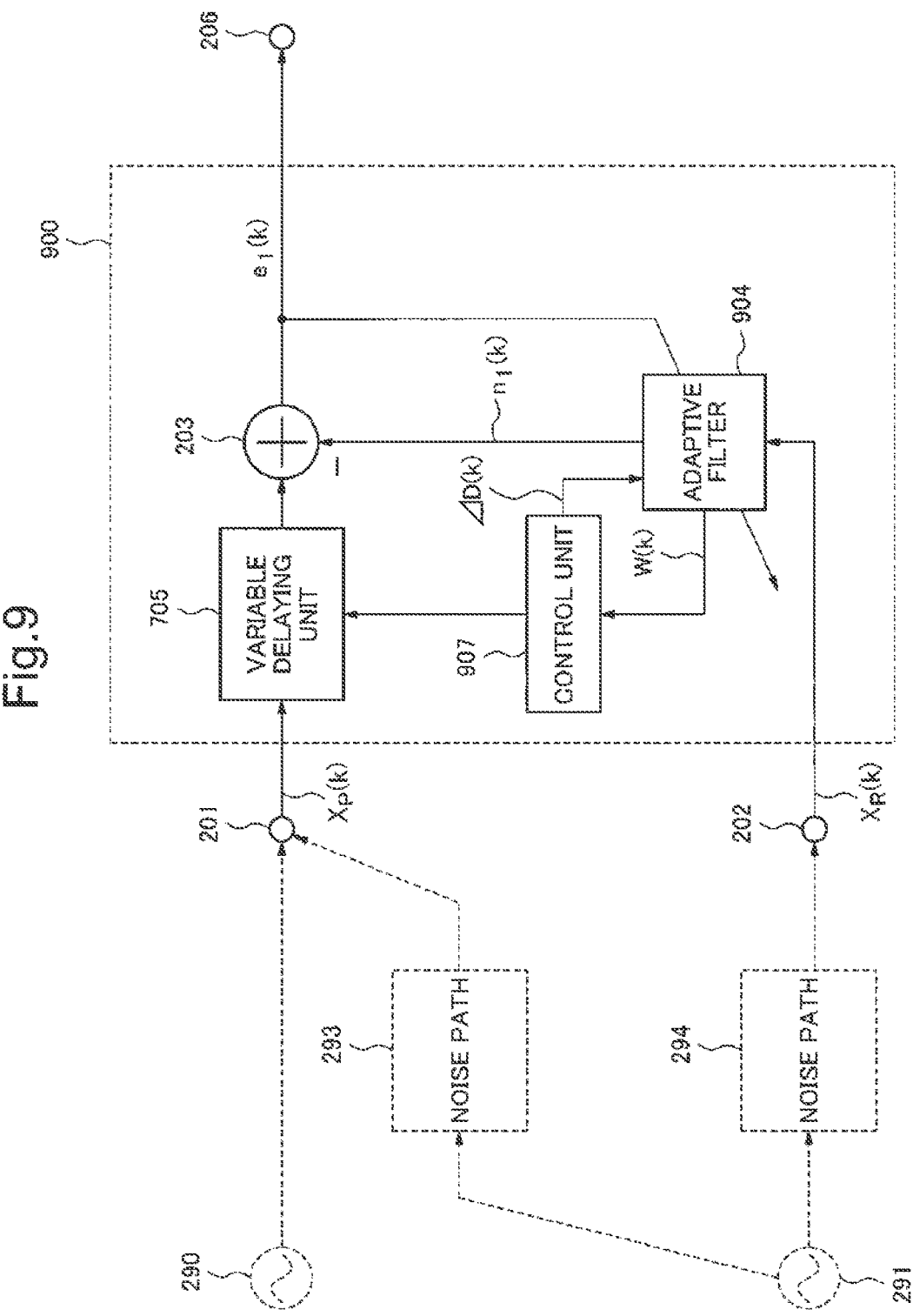
FIG. 9 is a block diagram showing a configuration of a signal processing device according to a sixth exemplary embodiment of the present invention.

A noise cancellation device 900 as the sixth exemplary embodiment of the signal processing device according to the present invention will be described using FIGS. 9 to 11. When comparing with the fifth exemplary embodiment, the noise cancellation device 900 according to the present exemplary embodiment is different from the fifth exemplary embodiment in having a control unit 907 instead of the control unit 707 and an adaptive filter 904 instead of the adaptive filter 704. Because other compositions except for those elements are same as those of the fifth exemplary embodiment, the same number is assigned to the same composition here and the description will be omitted.

The control unit 907 receives a filter coefficient vector W(k) from the adaptive filter 904 and obtains the most suitable number of delay samples D, and supplies that to the variable delaying unit 705. Further, the control unit 907 obtains the difference ΔD(k) between the number of delay samples D(k) which is newly obtained and the number of delay samples D(k-1) which was obtained just before, and feeds back to the adaptive filter 904. That is, the following (formula 25) holds.

$$\Delta D(k)=D(k)-D(k-1) \qquad \text{(formula 25)}$$

The adaptive filter 904 shifts the coefficient values using ΔD(k) supplied from the control unit 907. The state of the coefficient shift in the adaptive filter 904 is shown in FIG. 10 and FIG. 11. FIG. 10 represents the state of the coefficient shift when the delay D(k) decreases (ΔD(k)=-1), and FIG. 11 represents the state of the coefficient shift which respectively corresponds to the case where the delay D(k) increase (ΔD(k)=+1).

Figure 10:
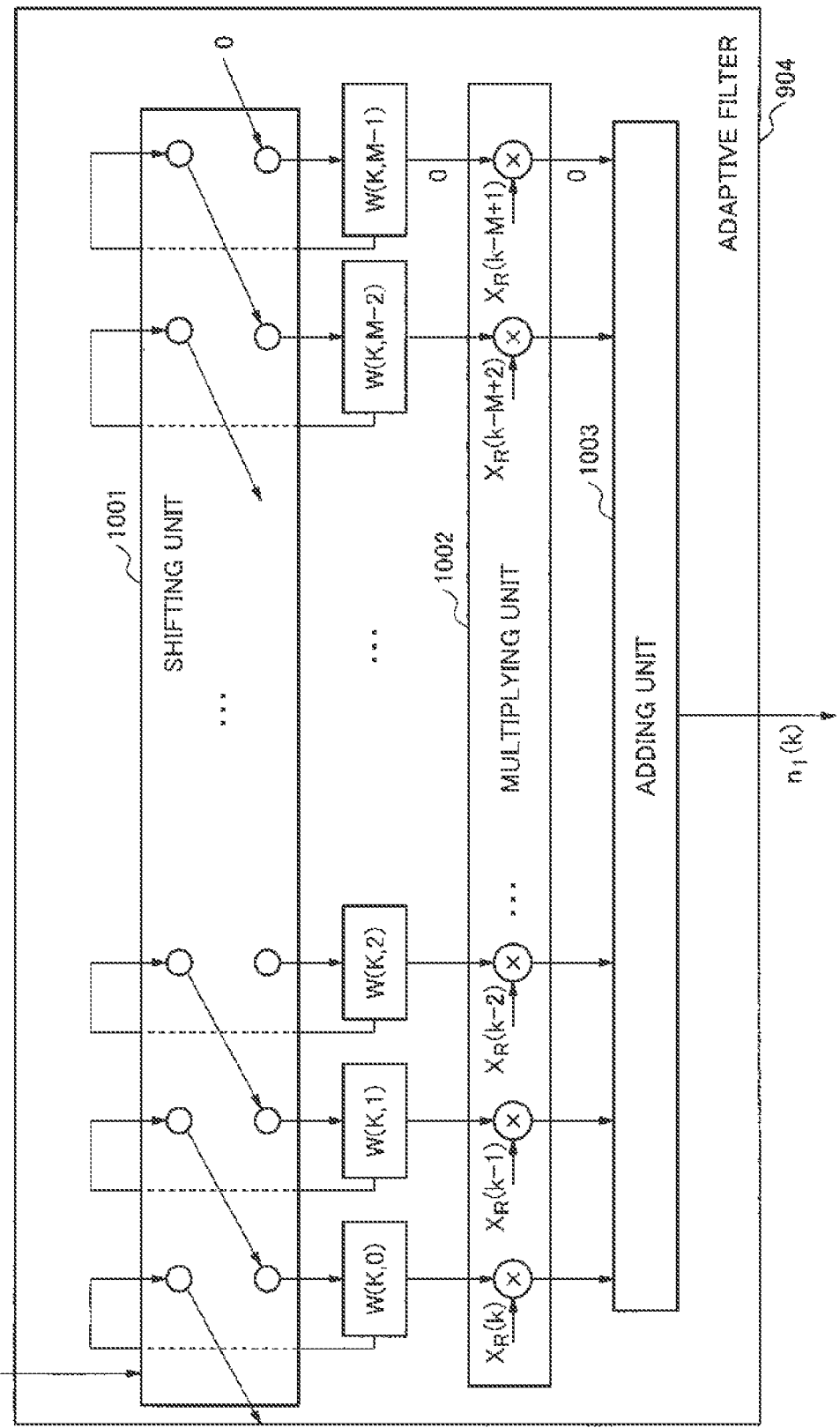
FIG. 10 is a block diagram showing a configuration of an adaptive filter according to the sixth exemplary embodiment of the present invention.

In FIG. 10, a shifting unit 1001 shifts the coefficient values that were w(k 0), w(k 1), . . . , w(k, M-1) into w(k 1), . . . , w(k, M-1), 0. These coefficient values are multiplied by $x_R(k)$ to $x_R(k-M+1)$ respectively by an multiplying unit 1002. An adding unit 1003 sums the products up, and outputs it as $n_1(k)$.

Figure 11:
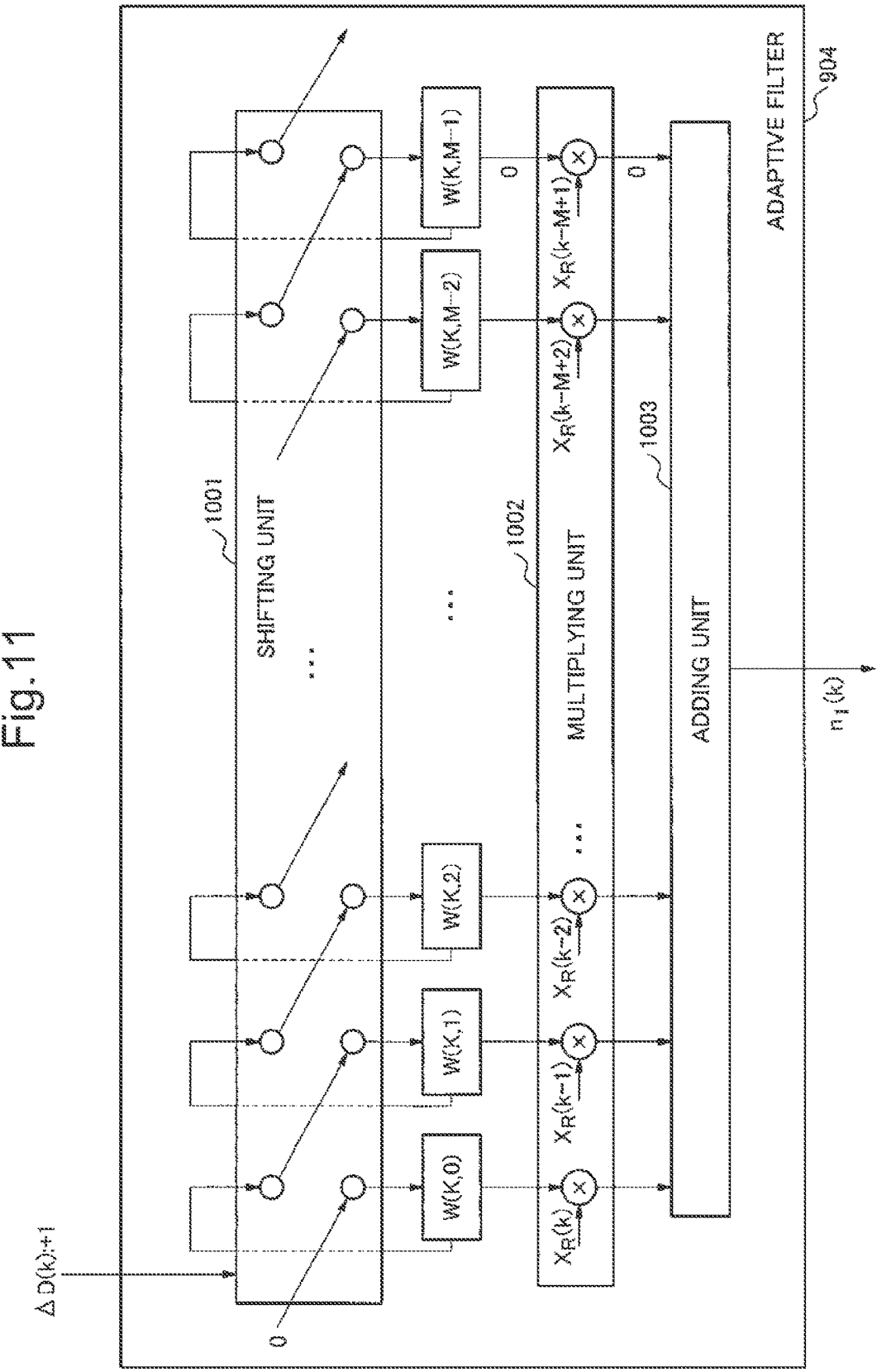
FIG. 11 is a block diagram showing a configuration of the adaptive filter according to the sixth exemplary embodiment of the present invention.

In FIG. 11, the shifting unit 1001 shifts the coefficient values that were w(k 0), w(k 1), . . . , w(k, M-1) into 0, w(k 0), w(k 1), . . . , w((k, M-2). These coefficient values are multiplied by $x_R(k)$ to $x_R(k-M+1)$ respectively by the multiplying unit 1002. The adding unit 1003 sums the products up, and outputs it as $n_1(k)$.

In FIG. 10 and FIG. 11, although a case of |ΔD(k)|=1 has been described, the present invention is not limited to that, and the amount of shift |ΔD(k)| of the shifting unit 1001 may be 2 or more. For example, when the delay D(k) is decreased by d (ΔD(k)=-d), the coefficient values that were w(k 0), w(k 1), . . . , w((k, M-1) before shifting will be w(k, d), . . . , w((k, M-1), 0, . . . , 0 after shifting. On the other hand, when the delay D(k) is increased by d (ΔD(k)=+d), the coefficient values that were w(k 0), w(k 1), . . . , w(k, M-1) before shifting will be 0, . . . , 0, w(k 0), . . . , w((k, M-d-1) after shifting.

(Seventh Exemplary Embodiment)

Figure 12:
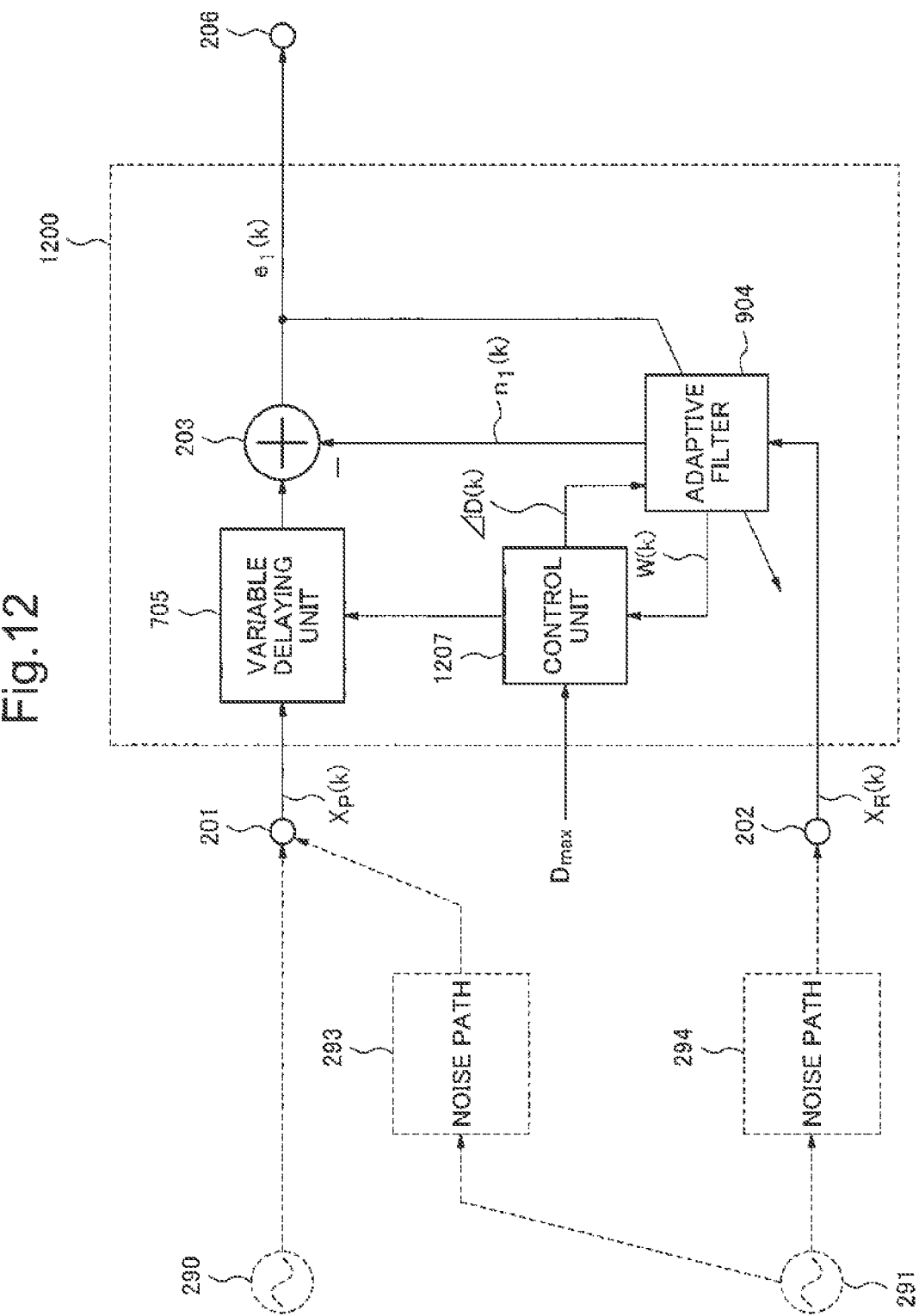
FIG. 12 is a block diagram showing a configuration of a signal processing device according to a seventh exemplary embodiment of the present invention.

A noise cancellation device 1200 as the seventh exemplary embodiment of the signal processing device according to the present invention will be described using FIG. 12. When comparing with the sixth exemplary embodiment, the noise cancellation device 1200 according to the present exemplary embodiment is different from the sixth exemplary embodiment in having a control unit 1207 instead of the control unit 907. Because other compositions except for those elements are same as those of the sixth exemplary embodiment, the same number is assigned to the same composition here and the description will be omitted.

The maximum value of delay Dmax which can be set from outside is supplied to the control unit 1207. The control unit 1207 calculates the number of delay samples D(k) using information about the coefficient supplied from the adaptive filter 904, and compares the number with the maximum value of delay Dmax. When the number of delay samples D(k) is smaller than Dmax, D(k) is supplied to the variable delaying unit 705, and when larger than Dmax, Dmax is supplied to the variable delaying unit 705. The variable delaying unit 705 limits the maximum amount of delay in the path to the output terminal 206 from the input terminal 201. Accordingly, the delay amount of the emphasized signal in the output terminal 206 can be made small.

By the above mentioned configuration, according to the present exemplary embodiment, even when the reference signal cannot be captured in the vicinity of the noise source and a delay amount to the noise source is unknown, the delay corresponding to the path to the input terminal 202 from the noise source is estimated, and enough noise cancellation with keeping the delay amount of the emphasized signal small can be achieved.

(Eighth Exemplary Embodiment)

Figure 13:
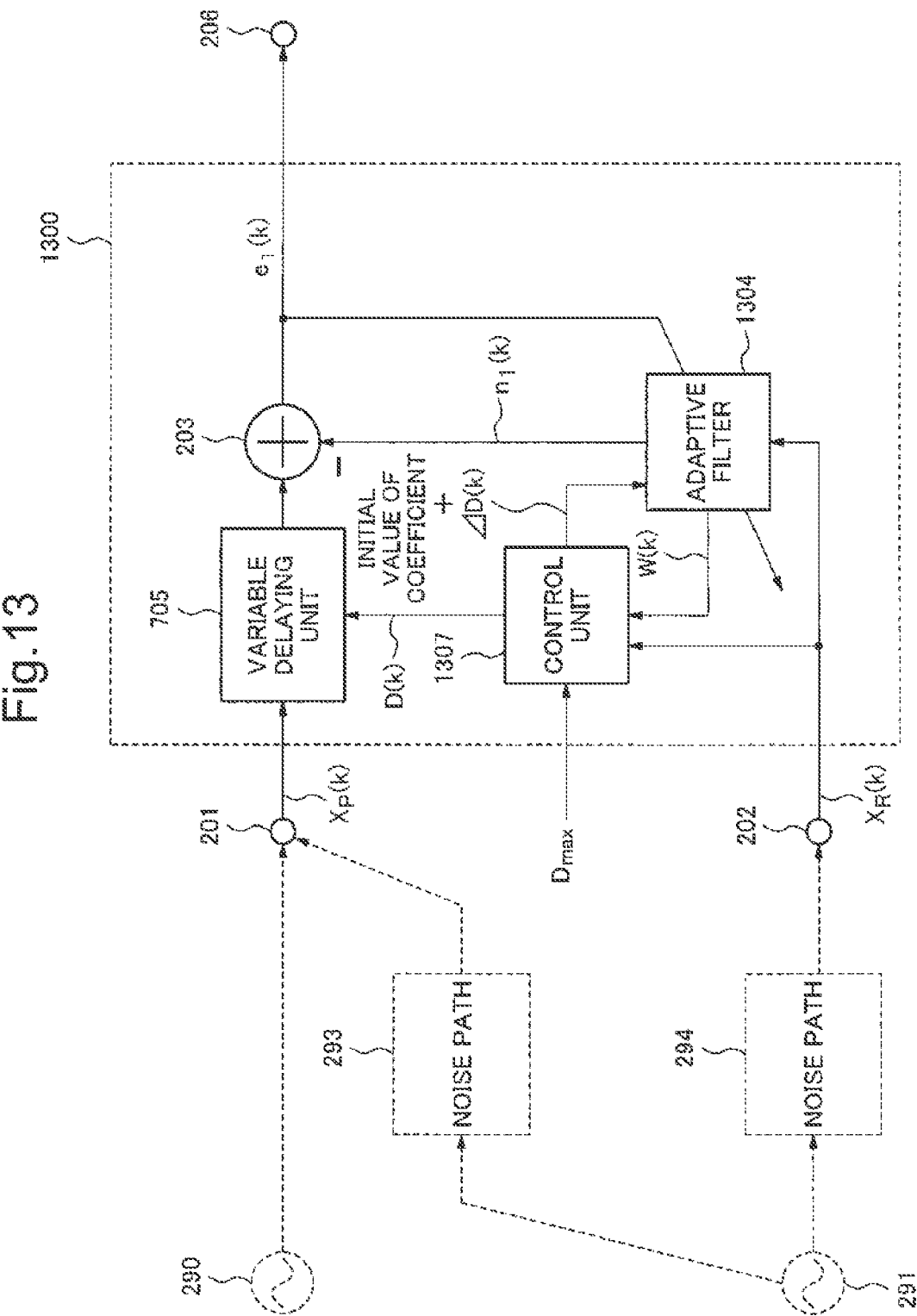
FIG. 13 is a block diagram showing a configuration of a signal processing device according to an eighth exemplary embodiment of the present invention.

A noise cancellation device 1300 as the eighth exemplary embodiment of the signal processing device according to the present invention will be described using FIG. 13. When comparing with the sixth exemplary embodiment, the noise cancellation device 1300 according to the present exemplary embodiment is different from the sixth exemplary embodiment in having a control unit 1307 instead of the control unit 907 and an adaptive filter 1304 instead of the adaptive filter 904. Because other compositions except for those elements are same as those of the sixth exemplary embodiment, the same number is assigned to the same composition here and the description will be omitted.

The control unit 1307 receives a reference signal from the input terminal 202, receives the coefficient vector W(k) from the adaptive filter 1304, obtains the most suitable number of delay samples D(k), and supplies that to the variable delaying unit 705. Further, The control unit 1307 obtains the difference ΔD(k) between the number of delay samples D(k) which is newly obtained and the number of delay samples D(k-1) which was obtained just before, and feeds back that to the adaptive filter 1304. Further, the control unit 1307 obtains an initial value of the coefficient value which is newly set to the head or the tail using the reference signal, the coefficient vector W(k) and ΔD(k), and supplies that to the adaptive filter 1304.

The adaptive filter 1304 shifts the coefficient values using ΔD(k) supplied from the control unit 1307. Further, the adaptive filter 1304 sets the value supplied from the control unit 1307 as the initial coefficient value that is newly set to the head or the tail for which the initial value is not obtained by shifting of the coefficient values.

[Initial Value Setting of Coefficient Value of Head and Tail]

According to the above-mentioned sixth exemplary embodiment, in FIG. 10 and FIG. 11, the coefficient update for each of the coefficient values of the head and the tail part was started with taking 0 as the initial values after a change had been made in the number of delay samples D(k). In contrast, according to the present exemplary embodiment, the coefficient update is started after an appropriate value has been set also to the initial values of those coefficients like the other coefficients. From this, faster convergence of coefficient and reduction in convergence time of the number of delay samples can be achieved.

The control unit 1307 can determine the initial value of the coefficient which is equivalent to a one newly added to the head or the tail of the adaptive filter 1304 using an envelope of the coefficient squared values or the absolute values. Because it is possible to think approximately that those coefficients which are equivalent to the newly added also follow an envelope.

When the control unit 1307 extrapolates a portion of one tap of the envelope which is obtained by the method described in the fifth exemplary embodiment, the value will be an expected value (estimated value) of the coefficient which is equivalent to the one newly added. When the envelope is approximated by a straight line, the control unit 1307 may subtract the slope of the straight line from the coefficient value (squared value or absolute value) of the head or the tail of the adaptive filter 1304.

It needs to pay attention that the expected value of the coefficient which is equivalent to the one newly added having been obtained in that way is a squared value or an absolute value persistently. The control unit 1307 can use, in the case of squared value, the square root, and in the case of absolute value, the value of which the intact value is combined with a sign, as the initial value of the coefficient value. Next, how to obtain a sign of new coefficient will be described.

[How to Obtain a Sign of New Coefficient]

The current output of the adaptive filter 1304 and the output of the subtracting unit 203 are expressed in (formula 9) and (formula 10).

$$n_1(k) = \sum_{j=k}^{k-M+1} x_R(j)w(k, k-j) \quad \text{(formula 9)}$$

$$e_1(k) = x_P(k) - n_1(k) \quad \text{(formula 10)}$$

<Case of ΔD(k)=+1, Delay Increases, Coefficient Values Shift to the Right (Number is +1)>

The output of the adaptive filter 1304 and the output of the subtracting unit 203 are expressed in (formula 11) and (formula 12).

$$n_{1+}(k) = \sum_{j=k}^{k-M+1} x_R(j)w(k, k-j-1) = \quad \text{(formula 11)}$$

-continued $$x_R(k)w(k, -1) + \sum_{j=k-1}^{k-M+1} x_R(j)w(k, k-j-1)$$

$$e_{1+}(k) = x_P(k) - n_{1+}(k) \quad \text{(formula 12)}$$

Because an error has to decrease by control of the delay D(k), (formula 13) holds.

$$|e_{1+}(k)| < |e_1(k)| \quad \text{(formula 13)}$$

Equivalently, (formula 14) holds.

$$e_{1+}^2(k) < e_1^2(k) \quad \text{(formula 14)}$$

When applying (formula 11) and (formula 12) to (formula 14), the following (formula 15) is obtained.

$$\left\{ x_P(j) - \sum_{j=k-1}^{k-M+1} x_R(j)w(k, k-j-1) - x_R(k)w(k, -1) \right\}^2 < \quad \text{(formula 15)}$$

$$e_1^2(k)$$

The right side of (formula 15) is a known value, and the left side is also known except for the third term. Further, because $x_R(k)$ is known including a sign and the estimated value of w(k, −1) can be used, the control unit 1307 can determine the sign of w(k, −1) from (formula 15).

<Case of ΔD(k)=−1, Delay Decreases, Coefficient Values Shift to the Left (Number is −1)>

The output of the adaptive filter 1304 and the output of the subtracting unit 203 are expressed in following (formula 16) and (formula 17).

$$n_{1-}(k) = \sum_{j=k}^{k-M+1} x_R(j)w(k, k-j+1) = \quad \text{(formula 16)}$$

$$\sum_{j=k}^{k-M+2} x_R(j)w(k, k-j+1) + x_R(k-M+1)w(k, M)$$

$$e_{1-}(k) = x_P(k) - n_{1-}(k) \quad \text{(formula 17)}$$

Because an error has to decrease by control of the delay D(k), (formula 18) holds.

$$|e_{1-}(k)| < |e_1(k)| \quad \text{(formula 18)}$$

Equivalently, the following (formula 19) holds.

$$e_{1-}^2(k) < e_1^2(k) \quad \text{(formula 19)}$$

When applying (formula 16) and (formula 17) to (formula 19), the following (formula 20) is obtained.

$$\left\{ x_P(j) - \sum_{j=k}^{k-M+2} x_R(j)w(k, k-j+1) - x_R(k-M+1)w(k, M) \right\}^2 \quad \text{(formula 20)}$$

$$< e_1^2(k)$$

The right side of (formula 20) is a known value, and the left side is also known except for the third term. Further, because $x_R(k-M+1)$ is known including a sign and the estimated value of w(k, M) can be used, the control unit 1307 can determine the sign of w(k, M) from (formula 20).

Further, the control unit 1307 applies both signs of negative and positive to w(k, −1) and w(k, M), calculates $e_{1+}(k)$ or $e_{1-}(k)$ of formula (12) or (formula 17) in two ways, compares those, and can take the sings corresponding to the smaller ones as sings of w(k, −1) and w(k, M).

[Reduction of Operation Amount in Calculation of Formula (II) and (Formula 16)]

The output of the adaptive filter 1304 before one sampling period, $n_1(k-1)$, is given by formula (21).

$$n_1(k-1) = \sum_{j=k-1}^{k-M} x_R(j)w(k-1, k-j-1) = \quad \text{(formula 21)}$$

$$\sum_{j=k-1}^{k-M+1} x_R(j)w(k-1, k-j-1) +$$

$$x_R(k-M)w(k-1, M-1)$$

When applying (formula 21) to formula (II), $n_{1+}(k)$ is given by (formula 22).

$$n_{1+}(k) = x_R(k)w(k,-1) + n_1(k-1) - x_R(k-M)w(k,M-1) \quad \text{(formula 22)}$$

However, it is assumed that the coefficient update step size is small enough, and a change in the coefficient value while k changes by 1 can be ignored. That is, w(k−1, j)=w(k, j), j=−1, 0, 1, . . . , M. Because the right side second term of (formula 22) is a value obtained in the past and known, the control unit 1307 can evaluate $|e_{1+}(k)|$ or $e_{1+}^2(k)$ for each different sign of w(k, −1) by newly calculating the right side third term.

In the same way, the output of the adaptive filter 1304 after one sampling period, $n_1(k+1)$, is given by formula (23).

$$n_1(k+1) = \sum_{j=k+1}^{k-M+2} x_R(j)w(k+1, k-j+1) = \quad \text{(formula 23)}$$

$$x_R(k+1)w(k+1, 0) + \sum_{j=k}^{k-M+2} x_R(j)w(k+1, k-j+1)$$

When applying (formula 23) to formula (16), $n_{1-}(k)$ is given by (formula 24).

$$n_{1-}(k) = n_1(k+1) - x_R(k+1)w(k0) + x_R(k-M+1)w(k,M) \quad \text{(formula 24)}$$

However, similarly to (formula 22), it is assumed w(k, j)=w(k+1, j), j=−1, 0, 1, . . . , M.

The right side first term of (formula 24) is the value obtained after one sampling period. Accordingly, the control unit 1307 can use $n_1(k+1)$ by delaying the calculation of the number of delay samples D(k) for one sampling period. At that time, the control unit 1307 can evaluate $|e_{1-}(k)|$ or $e_{1-}^2(k)$ for each different sign of w(k, M) only by newly calculating the right side second term in (formula 24).

As already described in the third exemplary embodiment, it is preferable that the timing when the variable delaying unit 705 and the adaptive filter 1304 are controlled is limited within time when the power of voice is small enough. By such selective control is applied to the variable delaying unit 705 and the adaptive filter 1304, more accurate control of delay and update of the adaptive filter coefficient are performed.

By the above-mentioned configuration, according to the present exemplary embodiment, even when the reference signal cannot be captured in the vicinity of the noise source and a delay amount to the noise source is unknown, the delay corresponding to the path to the input terminal 202 from the noise source is estimated by small operation amount and enough noise cancellation can be achieved.

(Ninth Exemplary Embodiment)

Figure 14:
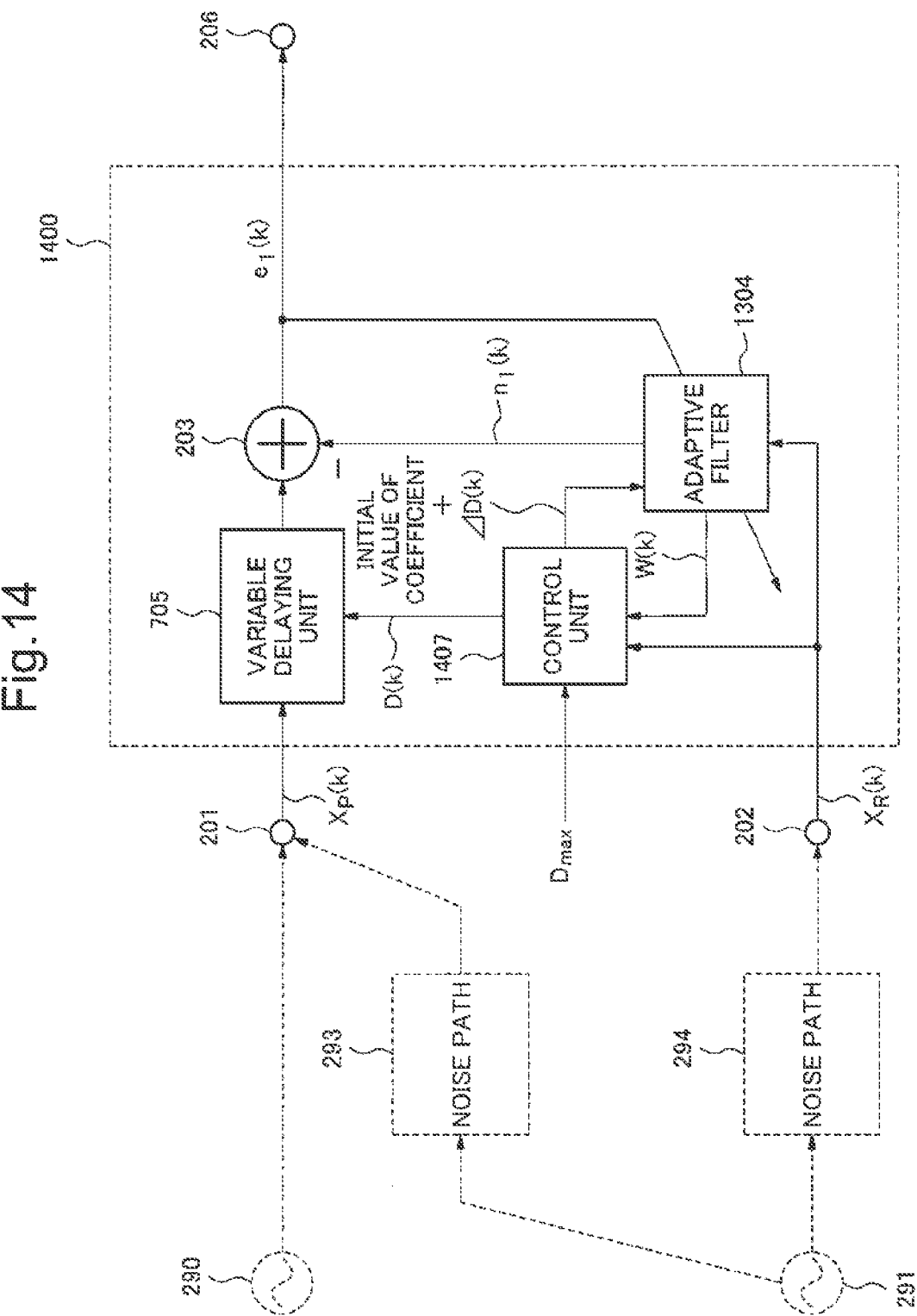
FIG. 14 is a block diagram showing a configuration of a signal processing device according to a ninth exemplary embodiment of the present invention.

A noise cancellation device 1400 as the ninth exemplary embodiment of the signal processing device according to the present invention will be described using FIG. 14. When comparing with the eighth exemplary embodiment, the noise cancellation device 1400 according to the present exemplary embodiment is different in having a control unit 1407 instead of the control unit 1307. Because other compositions except for those elements are same as those of the eighth exemplary embodiment, the same number is assigned to the same composition here and the description will be omitted.

The maximum value of delay Dmax which can be set from outside is supplied to the control unit 1407. The control unit 1407 receives a reference signal from the input terminal 202 and a coefficient vector W(k) from the adaptive filter 1304, obtains the most suitable number of delay samples D(K), and compares the number with the maximum value of delay Dmax. The control unit 1407 supplies D(K) to the variable delaying unit 705 when the number of delay samples D(K) is smaller than Dmax, and supplies Dmax to the variable delaying unit 705 when larger than Dmax. The variable delaying unit 705 limits the maximum amount of delay in the path to the output terminal 206 from the input terminal 201. Accordingly, the delay amount of the emphasized signal in the output terminal 206 can be made small.

By the above-mentioned configuration, according to the present exemplary embodiment, even when the reference signal cannot be captured in the vicinity of the noise source and a delay amount to the noise source is unknown, the delay corresponding to the path to the input terminal 202 from the noise source is estimated by small operation amount and enough noise cancellation with keeping the delay amount of the emphasized signal small can be achieved.

(Tenth Exemplary Embodiment)

A noise cancellation device 1500 as the tenth exemplary embodiment of the signal processing device according to the present invention will be described using FIG. 15. When comparing with the third exemplary embodiment, the noise cancellation device 1500 according to the present exemplary embodiment is different from the third exemplary embodiment in having an adaptive filter 1505 instead of the variable delaying unit 305. Because other compositions except for those elements are same as those of the third exemplary embodiment, the same number is assigned to the same composition here and the description will be omitted.

A main signal is supplied from the input terminal 201 to the adaptive filter 1505. The adaptive filter 1505 performs convolution of the main signal and the coefficients, and supplies the result to the subtracting unit 203. The subtracting unit 203 subtracts a pseudo-noise which is the output of the adaptive filter 204 from the filtered main signal which is the output of the adaptive filter 1505, and transmits the result to the output terminal 206 as an output, and at the same time, feeds back to the adaptive filters 204 and 1505.

The adaptive filter 1505 updates the coefficients so that the output power of the subtracting unit 203 is minimized, using the main signal supplied from the input terminal 201 and the output fed back from the subtracting unit 203. As coefficient updating algorithm, the adaptive filter 1505 may apply the exactly same one as the coefficient updating algorithm of the adaptive filter 204, or may apply different algorithm.

According to the present exemplary embodiment, the adaptive filter 204 models the noise path 293, and the adaptive filter 1505 models the noise path 294. That is, the impulse response of the adaptive filter 1505 converges on the impulse response in the noise path 294.

As already described in the third exemplary embodiment, it is preferable that the timing when coefficient update of the adaptive filters 204 and 1505 is limited within time when the power of voice is small enough. By such selective coefficient update is applied to the adaptive filters 204 and 1505, more accurate control of delay and update of the adaptive filter coefficient are performed.

By the above-mentioned configuration, according to the present exemplary embodiment, even when the reference signal cannot be captured in the vicinity of the noise source and a transfer characteristic to the noise source is unknown, the transfer characteristic corresponding to the path to the input terminal 202 from the noise source is estimated and enough noise cancellation can be achieved.

(Eleventh Exemplary Embodiment)

A noise cancellation device 1600 as the eleventh exemplary embodiment of the signal processing device according to the present invention will be described using FIG. 16. When comparing with the tenth exemplary embodiment, the noise cancellation device 1600 according to the present exemplary embodiment is different from the tenth exemplary embodiment in having adaptive filters 1604 and 1605 instead of the adaptive filters 204 and 1505, and further having a control unit 1607. Because other compositions except for those elements are same as those of the tenth exemplary embodiment, the same number is assigned to the same composition here and the description will be omitted.

The adaptive filter 1604 supplies information about the coefficients to the control unit 1607, and receives a first coefficient update control signal. The adaptive filter 1605 supplies information about the coefficients to the control unit 1607, and receives a second coefficient update control signal. The control unit 1607 evaluates, based on the information about the coefficients supplied from the adaptive filters 1604 and 1605, the convergent degree of those, and generates the first and second coefficient update control signals. The control unit 1607 supplies the first coefficient update control signal to the adaptive filter 1604, and supplies the second coefficient update control signal to the adaptive filter 1605. The adaptive filters 1604 and 1605 receive the second coefficient update control signal and the first coefficient update control signal, and control coefficient update according to those signals respectively.

The control unit 1607 generates the first coefficient update control signal and the second coefficient update control signal so that both do not perform coefficient update simultaneously. For example, the control unit 1607 can generate the first coefficient update control signal and the second coefficient update control signal so as to make the adaptive filter 1604 converge first, and the adaptive filter 1605 converge subsequently. In order to do that, the control unit 1607 needs to evaluate the convergent degree of the adaptive filter 1604. This can be performed by the control unit 1607 using the information about the coefficients of the adaptive filter 1604.

The specific method about the convergent degree evaluation of the adaptive filter using the information about the coefficients is disclosed by Japanese Patent Application Publication No. 1993-268105. The method disclosed here is a method in which it is assumed that the coefficients have converged when the amount of change in the squared value summation or the absolute value summation of the coefficients becomes small. When a partial summation is used instead of the summation, the similar effect is obtained also.

Similarly, the control unit 1607 can also evaluate the convergent degree of the adaptive filter 1605. Accordingly, the control unit 1607 can make the adaptive filter 1605 converge first, and then the adaptive filter 1604 converge. Further, the control unit 1607 can also be configured so as not only to keep, in process of making one adaptive filter converge, other adaptive filter from converging, but also to set arbitrary values which are less than the usual amount to the coefficient update amounts for both. With this function, the control unit 1607 can also be configured so as to perform the coefficient update for the adaptive filter 1604 with the coefficient update amount of 70% of the usual, and for the adaptive filter 1605 with the coefficient update amount of 30% of the usual. The control unit 1607 may set coefficient update proportions for both to be 100% by adding, or not to be.

Above, in the present exemplary embodiment, the method of evaluating the respective convergent degrees using the coefficient values of the adaptive filters 1604 and 1605 and controlling coefficient update for both using the convergent degree has been described. With respect to the evaluation method of the convergent degree of these adaptive filters 1604 and 1605, various methods other than one using the coefficient value are also known. Any of these convergent degree estimation methods can be applied to the present exemplary embodiment.

By the above-mentioned configuration, according to the present exemplary embodiment, even when the reference signal cannot be captured in the vicinity of the noise source and a transfer characteristic to the noise source is unknown, the transfer characteristic corresponding to the path to the input terminal from the noise source is estimated and enough noise cancellation can be achieved.

(Other Exemplary Embodiment)

While a plurality of exemplary embodiments of the signal processing device according to the present invention has been explained above in detail, those systems or devices in which the separate features included in the respective exemplary embodiments are combined is, no matter how they are combined, also included in the category of the present invention.

Further, the present invention may be applied to a system including a plurality of equipments, or may be applied to a single device.

Further, the present invention can also be applied in a case where an information processing program which realizes the function of the above-mentioned exemplary embodiments is provided to a system or a device directly or remotely. Accordingly, in order to realize the function of the present invention by a computer, a program to be installed in a computer or a medium which stores the program, and a WWW (World Wide Web) server which lets the program download are also included in the category of the present invention.

The signal processing device based on the present invention described above can be realized by software. That is, it is possible to configure a program to be used for signal processing by composing the processing operation in each unit in the signal processing device of each exemplary embodiment mentioned above as steps or procedures in software. Such program is executed by a processor such as a DSP (Digital Signal Processor) or the like which is included in the signal processing device or the noise cancellation device.

Moreover, a program product including such program or a storage medium which stores such program is also included in the category of the present invention.

FIG. 17 is a configuration diagram of a computer 1700 which executes the signal processing program in a case where the first exemplary embodiment is configured using a signal processing program. The computer 1700 includes an input unit 1701, a CPU 1702, an output unit 1703 and a memory 1704.

By reading the signal processing program stored in the memory 1704, the CPU 1702 controls operation of the computer 1700. That is, in Step S1711, the CPU 1702 which has executed the signal processing program obtains a main signal and a reference signal. Next, in Step S1713, the CPU 1702 delays the main signal to generate a delayed main signal with a delay amount based on transmission distance of a second signal from a second signal source until the reference signal is inputted. Further, in Step S1715, the CPU 1702 performs filtering processing of an adaptive filter using coefficients which are updated based on an estimated first signal, and obtains a pseudo second signal. In Step S1721, further, the CPU 1702 subtracts the pseudo second signal, which is estimated to be mixed in the main signal, from the delayed first mixed signal, and outputs an estimated desired signal (=error). From this, the same effect as the first exemplary embodiment can be obtained.

[Other Expressions of the Exemplary Embodiment]

The whole or part of the present exemplary embodiments disclosed above can be described as the following supplementary notes, but not limited to the followings.

(Supplementary Note 1)

A signal processing device characterized by comprising:
a first input means for obtaining a first signal;
a second input means for obtaining a second mixed signal in which the first signal and the second signal are mixed in a different ratio from the first mixed signal;
a delay means for generating a delayed first mixed signal by delaying the first mixed signal with a delay amount based on transmission distance from a generation source of the second signal to the second input means;
a subtracting means for outputting the first mixed signal; and
an adaptive filter which generates the pseudo second signal using coefficients which are updated based on the estimated first signal with respect to the second mixed signal.

(Supplementary Note 2)

The signal processing device according to supplementary note 1 characterized by
the delay means which controls the delay amount of the estimated first signal.

(Supplementary Note 3)

The signal processing device according to supplementary note 1 or 2 characterized by
controlling the delay amount of the first mixed signal of the delay means using the coefficients of the adaptive filter.

(Supplementary Note 4)

The signal processing device according to supplementary note 2 or 3 characterized by
controlling the delay amount in a range that does not exceed a predetermined upper limit value.

(Supplementary Note 5)

The signal processing device according to any one of supplementary notes 1 to 4 characterized by
the adaptive filter which changes the coefficients according to a change in the delay amount.

(Supplementary Note 6)

A signal processing method characterized by comprising:
obtaining a first signal;
generating a delayed first mixed signal by delaying the first mixed signal with a delay amount based on transmission distance from a generation source of the second signal until the second mixed signal being inputted;
generating a pseudo second signal which is estimated to be mixed in the second mixed signal; and
outputting the pseudo second signal.

(Supplementary Note 7)

The signal processing method according to supplementary note 6 characterized by comprising:
controlling the delay amount of the first mixed signal using the estimated first signal.

(Supplementary Note 8)

The signal processing method according to supplementary note 6 or 7 characterized by comprising:
controlling the delay amount of the first mixed signal using the coefficients of the adaptive filter.

(Supplementary Note 9)

The signal processing method according to supplementary note 7 or 8 characterized by comprising:
controlling the delay amount in a range which does not exceed a predetermined upper limit value.

(Supplementary Note 10)

The signal processing method according to any one of supplementary notes 6 to 9 characterized by comprising:
changing the coefficients of the adaptive filter according to the delay amount.

(Supplementary Note 11)

A signal processing program characterized by causing a computer to execute:
a step for obtaining a first signal;
a step for obtaining a second mixed signal in which the first signal and the second signal are mixed in a different ratio from the first mixed signal;
a step for generating a delayed first mixed signal by delaying the first mixed signal with a delay amount based on transmission distance from a generation source of the second signal until the second mixed signal being inputted;
a step for generating the pseudo second signal which is estimated to be mixed in the second mixed signal; and
a step for outputting the pseudo second signal.

While the present invention has been described with reference to the exemplary embodiments, the present invention is not limited to the above mentioned exemplary embodiments. Various changes in form and details of the present invention which can be understood by those skilled in the art may be made therein without departing from the spirit and scope of the present invention.

This application claims priority from Japanese Patent Application No. 2010-230062, filed on Oct. 12, 2010, the contents of which are incorporation herein by reference in their entirety.

DESCRIPTION OF THE REFERENCE NUMERALS

101 First input unit
102 Second input unit
103 Subtracting unit
105 Delaying unit
201, 202 Input terminal
203 Subtracting unit
104, 204, 704, 904, 1304, 1505, 1604, 1605 Adaptive filter
205 Fixed delaying unit 206 Output terminal
305, 505, 705 Variable delaying unit
412, 612, 707, 907, 1207, 1307, 1407, 1607 Control unit

The invention claimed is:

1. A signal processing device comprising:
   a first input unit which obtains a first mixed signal in which a first signal and a second signal are mixed;
   a second input unit which obtains a second mixed signal in which the first signal and the second signal are mixed in a different ratio from the first mixed signal;
   a delay unit which generates a delayed first mixed signal by delaying the first mixed signal with a delay amount based on transmission distance from a generation source of the second signal to the second input unit;
   a subtracting unit which outputs an estimated first signal in which a pseudo second signal is subtracted from the delayed first mixed signal; and
   an adaptive filtering unit which generates the pseudo second signal applying coefficients which are updated based on the estimated first signal and the second mixed signal,
   wherein the delay amount is adaptively controlled using the estimated first signal such that the estimated first signal is minimized.

2. The signal processing device according to claim 1, wherein
   the delay unit controls the delay amount of the first mixed signal using the coefficients of the adaptive filtering unit.

3. The signal processing device according to claim 1, wherein
   the delay unit controls the delay amount in a range that does not exceed a predetermined upper limit value.

4. The signal processing device according to claim 1, wherein
   the adaptive filtering means changes the coefficients according to a change of the delay amount.

5. A signal processing method comprising:
   obtaining a first mixed signal in which a first signal and a second signal are mixed;
   obtaining a second mixed signal in which the first signal and the second signal are mixed in a different ratio from the first mixed signal;
   generating a delayed first mixed signal by delaying the first mixed signal with a delay amount based on transmission distance from a generation source of the second signal until the second mixed signal being inputted;
   outputting an estimated first signal in which a pseudo second signal has been subtracted from the delayed first mixed signal; and
   generating the pseudo second signal applying coefficients which are updated based on the estimated first signal and the second mixed signal,
   wherein the delay amount is adaptively controlled using the estimated first signal such that the estimated first signal is minimized.

6. The signal processing method according to claim 5 comprising:
   controlling the delay amount of the first mixed signal using the coefficients of the adaptive filtering means.

7. The signal processing method according to claim 5 comprising:
   changing the coefficients of the adaptive filtering means according to the delay amount.

8. A non-transitory computer readable medium storing a signal processing program which causes a computer to execute the steps comprising:
   a step for obtaining a first mixed signal in which a first signal and a second signal are mixed;
   a step for obtaining a second mixed signal in which the first signal and the second signal are mixed in a different ratio from the first mixed signal;
   a step for generating a delayed first mixed signal by delaying the first mixed signal with a delay amount based on transmission distance from a generation source of the second signal until the second mixed signal being inputted;
   a step for outputting an estimated first signal in which a pseudo second signal has been subtracted from the delayed first mixed signal; and
   a step for generating the pseudo second signal applying coefficients which are updated based on the estimated first signal and the second mixed signal,
   wherein the delay amount is adaptively controlled using the estimated first signal such that the estimated first signal is minimized.

9. A signal processing device comprising:
   a first input means for obtaining a first mixed signal in which a first signal and a second signal are mixed;
   a second input means for obtaining a second mixed signal in which the first signal and the second signal are mixed in a different ratio from the first mixed signal;
   a delay means for generating a delayed first mixed signal by delaying the first mixed signal with a delay amount based on transmission distance from a generation source of the second signal to the second input means;
   a subtracting means for outputting an estimated first signal in which a pseudo second signal is subtracted from the delayed first mixed signal; and
   an adaptive filtering means for generating the pseudo second signal applying coefficients which are updated based on the estimated first signal and the second mixed signal,
   wherein the delay amount is adaptively controlled using the estimated first signal such that the estimated first signal is minimized.

* * * * *